US008896755B2

(12) United States Patent
Kitazato et al.

(10) Patent No.: US 8,896,755 B2
(45) Date of Patent: Nov. 25, 2014

(54) RECEPTION APPARATUS, RECEPTION METHOD, PROGRAM, AND INFORMATION PROCESSING SYSTEM

(75) Inventors: Naohisa Kitazato, Tokyo (JP); Mark Eyer, Woodinville, WA (US)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 13/593,554

(22) Filed: Aug. 24, 2012

(65) Prior Publication Data

US 2013/0215327 A1 Aug. 22, 2013

Related U.S. Application Data

(60) Provisional application No. 61/531,360, filed on Sep. 6, 2011.

(51) Int. Cl.
| | | |
|---|---|---|
| H04N 7/00 | (2011.01) | |
| H04N 11/00 | (2006.01) | |
| H04N 15/00 | (2006.01) | |
| H04N 13/00 | (2006.01) | |
| H04N 5/38 | (2006.01) | |
| H04N 5/445 | (2011.01) | |
| G06F 3/00 | (2006.01) | |
| G06F 13/00 | (2006.01) | |
| H04N 7/10 | (2006.01) | |
| H04N 7/025 | (2006.01) | |
| H04N 7/173 | (2011.01) | |
| H04N 9/80 | (2006.01) | |
| H04N 21/6543 | (2011.01) | |
| H04N 21/44 | (2011.01) | |
| H04N 21/81 | (2011.01) | |
| H04N 5/44 | (2011.01) | |

(52) U.S. Cl.
CPC ......... *H04N 5/4401* (2013.01); *H04N 21/6543* (2013.01); *H04N 21/44008* (2013.01); *H04N 21/8173* (2013.01)

USPC ............... 348/461; 348/43; 348/723; 725/51; 725/32; 725/41; 725/110; 725/132; 386/241

(58) Field of Classification Search
None
See application file for complete search history.

(56) References Cited

U.S. PATENT DOCUMENTS 5,818,935 A 10/1998 Maa
6,373,534 B1 4/2002 Yasuki et al.
(Continued)

FOREIGN PATENT DOCUMENTS

JP 11-27641 A 1/1999
JP 2003-308328 A 10/2003
(Continued)

OTHER PUBLICATIONS

International Search Report issued Sep. 25, 2012 in PCT/JP2012/071969 filed Aug. 30, 2012 with English language translation.

(Continued)

*Primary Examiner* — Jefferey Harold
*Assistant Examiner* — Sean Haiem
(74) *Attorney, Agent, or Firm* — Oblon, Spivak, McClelland, Maier & Neustadt, L.L.P.

(57) ABSTRACT

Disclosed herein is a reception apparatus including: a reception portion configured to receive audio video content; a trigger extraction portion configured to extract trigger information for operating an application program transmitted along with the audio video content and executed in interlocked relation to the audio video content; a table acquisition portion configured to acquire a correspondence table for associating the trigger information with commands for controlling the operation of the application program; a command determination portion configured such that, based on the acquired correspondence table, the command determination portion determines the commands associated with the extracted trigger information; and a control portion configured to control the operation of the application program in response to the determined commands.

12 Claims, 17 Drawing Sheets

(56) References Cited

U.S. PATENT DOCUMENTS

| | | |
|---|---|---|
| 2001/0046069 A1 | 11/2001 | Jones |
| 2002/0033844 A1 | 3/2002 | Levy et al. |
| 2002/0062382 A1 | 5/2002 | Rhoads et al. |
| 2002/0124249 A1 | 9/2002 | Shintani et al. |
| 2002/0162120 A1 | 10/2002 | Mitchell |
| 2003/0093792 A1 | 5/2003 | Labeeb et al. |
| 2003/0187798 A1 | 10/2003 | McKinley et al. |
| 2003/0195021 A1 | 10/2003 | Yamashita et al. |
| 2005/0005303 A1* | 1/2005 | Barone et al. ............... 725/110 |
| 2005/0192933 A1 | 9/2005 | Rhoads et al. |
| 2005/0262539 A1* | 11/2005 | Barton et al. ............... 725/90 |
| 2006/0089933 A1* | 4/2006 | Khandelwal et al. ........... 707/10 |
| 2007/0022437 A1* | 1/2007 | Gerken ................. 725/41 |
| 2007/0055689 A1 | 3/2007 | Rhoads et al. |
| 2007/0124796 A1 | 5/2007 | Wittkotter |
| 2008/0049971 A1 | 2/2008 | Ramos et al. |
| 2008/0082618 A1 | 4/2008 | Jones |
| 2008/0275906 A1 | 11/2008 | Rhoads et al. |
| 2009/0034556 A1* | 2/2009 | Song et al. ................. 370/471 |
| 2009/0138484 A1 | 5/2009 | Ramos et al. |
| 2009/0320073 A1* | 12/2009 | Reisman ................. 725/51 |
| 2010/0162307 A1 | 6/2010 | Suh et al. |
| 2010/0186042 A1 | 7/2010 | Roop et al. |
| 2011/0010737 A1 | 1/2011 | Bouazizi et al. |
| 2011/0075990 A1* | 3/2011 | Eyer ................. 386/241 |
| 2011/0088075 A1 | 4/2011 | Eyer |
| 2011/0128443 A1 | 6/2011 | Blanchard et al. |
| 2011/0221863 A1* | 9/2011 | Eyer ................. 348/43 |
| 2011/0243536 A1 | 10/2011 | Eyer |
| 2011/0246488 A1 | 10/2011 | Eyer |
| 2011/0247028 A1 | 10/2011 | Eyer |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1* | 12/2011 | Blanchard et al. ........... 725/32 |
| 2012/0044418 A1 | 2/2012 | Eyer |
| 2012/0047531 A1* | 2/2012 | Eyer ................. 725/37 |
| 2012/0050619 A1* | 3/2012 | Kitazato et al. ............... 348/723 |
| 2012/0050620 A1 | 3/2012 | Kitazato |
| 2012/0054214 A1 | 3/2012 | Yamagishi et al. |
| 2012/0054235 A1* | 3/2012 | Kitazato et al. ............... 707/770 |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1* | 3/2012 | Hattori et al. ............ 375/240.01 |
| 2012/0072965 A1* | 3/2012 | Dewa ................. 725/132 |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0236113 A1 | 9/2012 | Eyer |
| 2013/0024897 A1 | 1/2013 | Eyer |

FOREIGN PATENT DOCUMENTS

| | | |
|---|---|---|
| JP | 2006-245653 | 9/2006 |
| JP | 2010-182323 A | 8/2010 |

OTHER PUBLICATIONS

International Search Report and Written Opinion issued Oct. 5, 2012 in PCT/US 12/46663 filed Jul. 13, 2012.

International Search Report and Written Opinion issued Oct. 5, 2012 in PCT/US 12/46454 filed Jul. 12, 2012.

U.S. Appl. No. 13/304,126, filed Nov. 23, 2011, Eyer.

U.S. Appl. No. 13/422,203, filed Mar. 16, 2012, Kitazato, et al.

U.S. Appl. No. 13/452,376, filed Apr. 20, 2012, Kitahara, et al.

U.S. Appl. No. 13/562,946, filed Jul. 31, 2012, Eyer.

U.S. Appl. No. 13/559,166, filed Jul. 26, 2012, Eyer.

U.S. Appl. No. 13/490,216, filed Jun. 6, 2012, Eyer.

U.S. Appl. No. 13/554,688, filed Jul. 20, 2012, Eyer.

U.S. Appl. No. 13/559,188, filed Jul. 26, 2012, Kitazato.

U.S. Appl. No. 13/527,435, Jun. 19, 2012, Eyer.

U.S. Appl. No. 13/587,975, Aug. 17, 2012, Kitazato.

International Search Report and Written Opinion issued May 17, 2013 in PCT/US2013/030646 filed Mar. 13, 2013.

International Search Report and Written Opinion issued May 31, 2013 in PCT/US13/33133 filed Mar. 20, 2013.

International Search Report and Written Opinion issued Jun. 17, 2013 in PCT/US2013/036075 filed Apr. 11, 2013.

International Search Report and Written Opinion of the International Searching Authority issued Oct. 5, 2012, in PCT/US12/46663.

\* cited by examiner

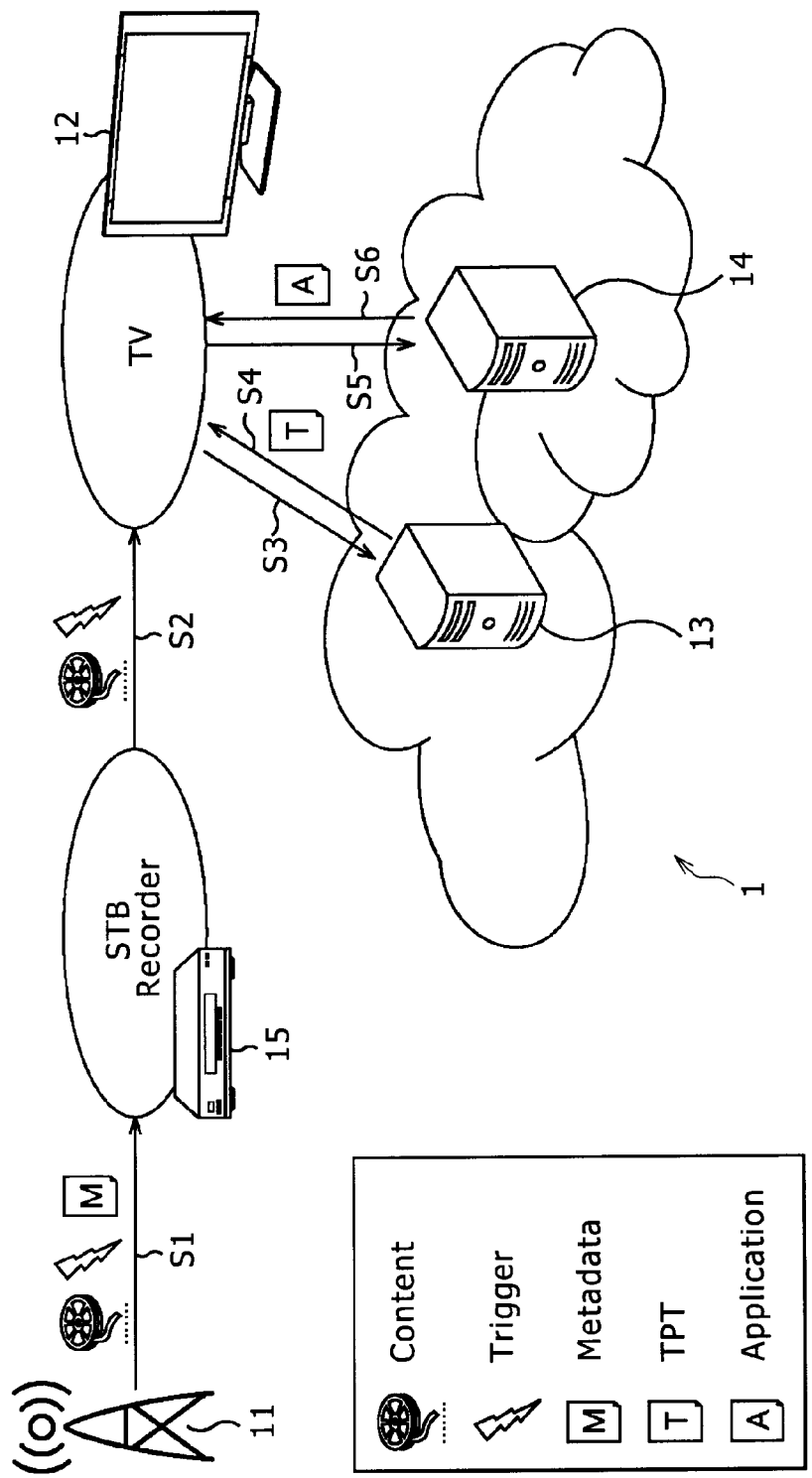

TWO-DIMENSIONAL BARCODE
→TRIGGER INFORMATION

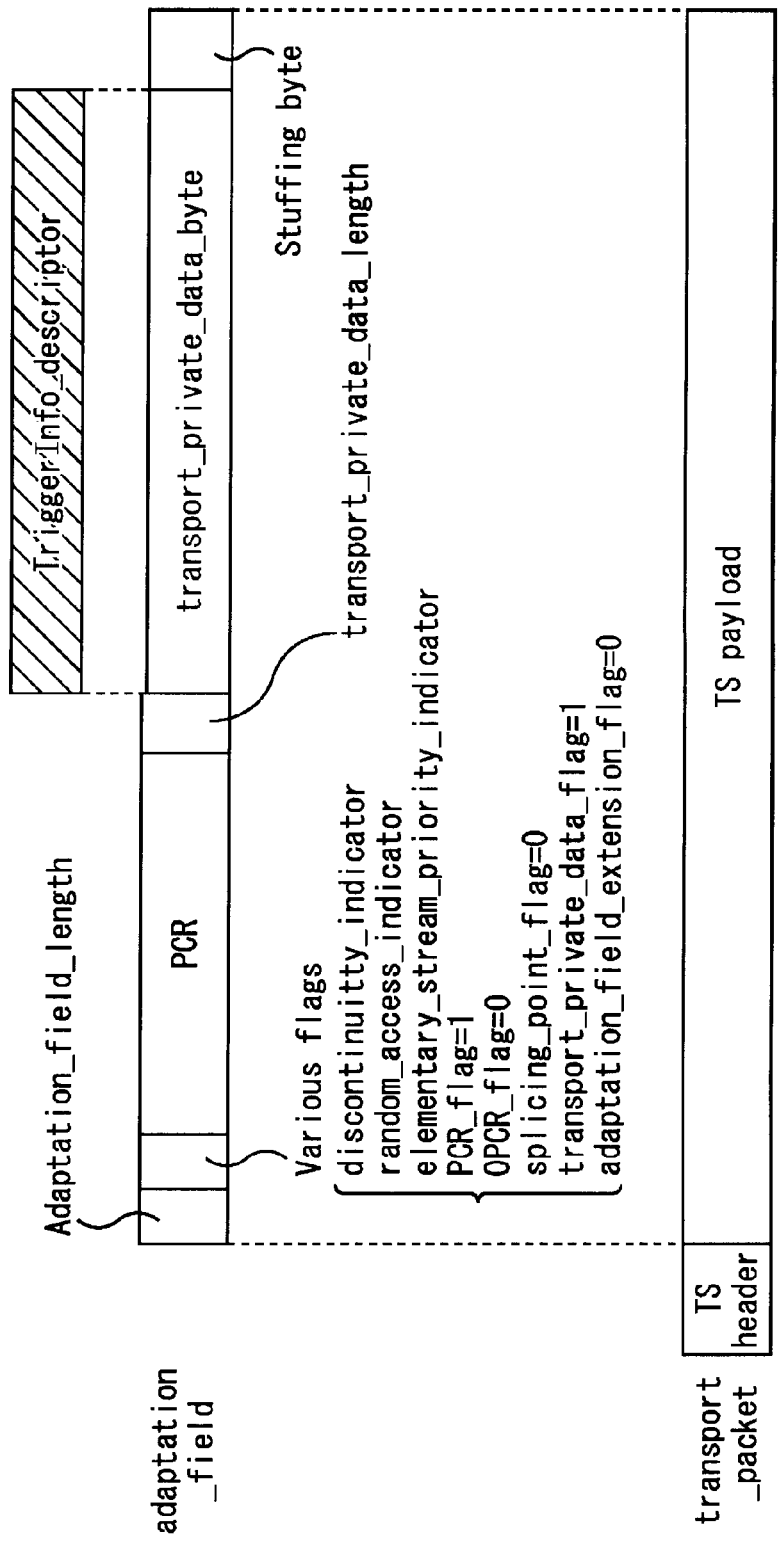

FIG. 7

| ITEM NAME | DESCRIPTION |
|---|---|
| domain_name | INFORMATION FOR DETERMINING THE TPT SERVER DESIGNATES INFORMATION INDICATIVE OF THE DOMAIN NAME OF THE TPT SERVER |
| program_id | ID FOR IDENTIFYING AV CONTENT |
| trigger_id | ID FOR IDENTIFYING TRIGGER INFORMATION MAY DESIGNATE A SPECIFIC COMMAND |
| trigger_validity | INFORMATION INDICATIVE OF THE PROBABILITY OF TRIGGER INFORMATION BECOMING VALID DESIGNATES THE PROBABILITY USING AN INTEGER OF THE INVERSE THEREOF REGARDED AS 1 IF NOTHING IS DESIGNATED AN OPTIONAL ITEM |

F I G . 8

`<domain_name>/<program_id>?id=<trigger_id>(&vrate=<trigger_validity>)`

FIG. 9

| Element/Attribute (with @) | Number to be permitted | Description & Value |
|---|---|---|
| tpt | 1 | |
| @program | 1 | domain_name/program_id |
| command | 1..N | |
| @id | 1 | Equal to Trigger_id |
| @destination | 0..1 | Device type<br>"receiver":receiver itself<br>"external_1":external device type1<br>"external_2":external device type2 |
| @action | 1 | Action<br>"execute", "register", "suspend", "terminate", "event" |
| application | 1 | Description for target App |
| @id | 1 | App ID |
| @type | 1 | App type |
| @url | 0..1 | App URL |
| @priority | 0..1 | Priority to Persist<br>1:High 0:Normal |
| @expire_date | 0..1 | Expire date |
| event | 0..1 | Description for event |
| @id | 1 | Event ID |
| data | 0..1 | Embedded data |

FIG.10

```
<tpt program="abc.tv/300">
    <command id=1 destination="receiver" action="register">
        <application id="1" type="html" url="xxx.com/yyy1" expire_date="2011-01-21"/>
    </command>
    <command id=2 destination="receiver" action="execute">
        <application id="1" type="html" url="xxx.com/yyy1" expire_date="2011-01-21"/>
    </command>
    <command id=3 destination="receiver" action="event">
        <application id="1"/>
        <event id="event1">
            <data>zzzzzz・・・・z</data>
        </event>
    </command>
    <command id=4 destination="receiver" action="suspend">
        <application id="1"/>
    </command>
    <command id=5 destination="receiver" action="terminate">
        <application id="1"/>
    </command>
    <command id=12 destination="receiver" action="execute">
        <application id="2" type="html" url="xxx.com/yyy2" expire_date="2011-01-22"/>
    </command>
    <command id=15 destination="receiver" action="terminate">
        <application id="2"/>
    </command>
</tpt>
```

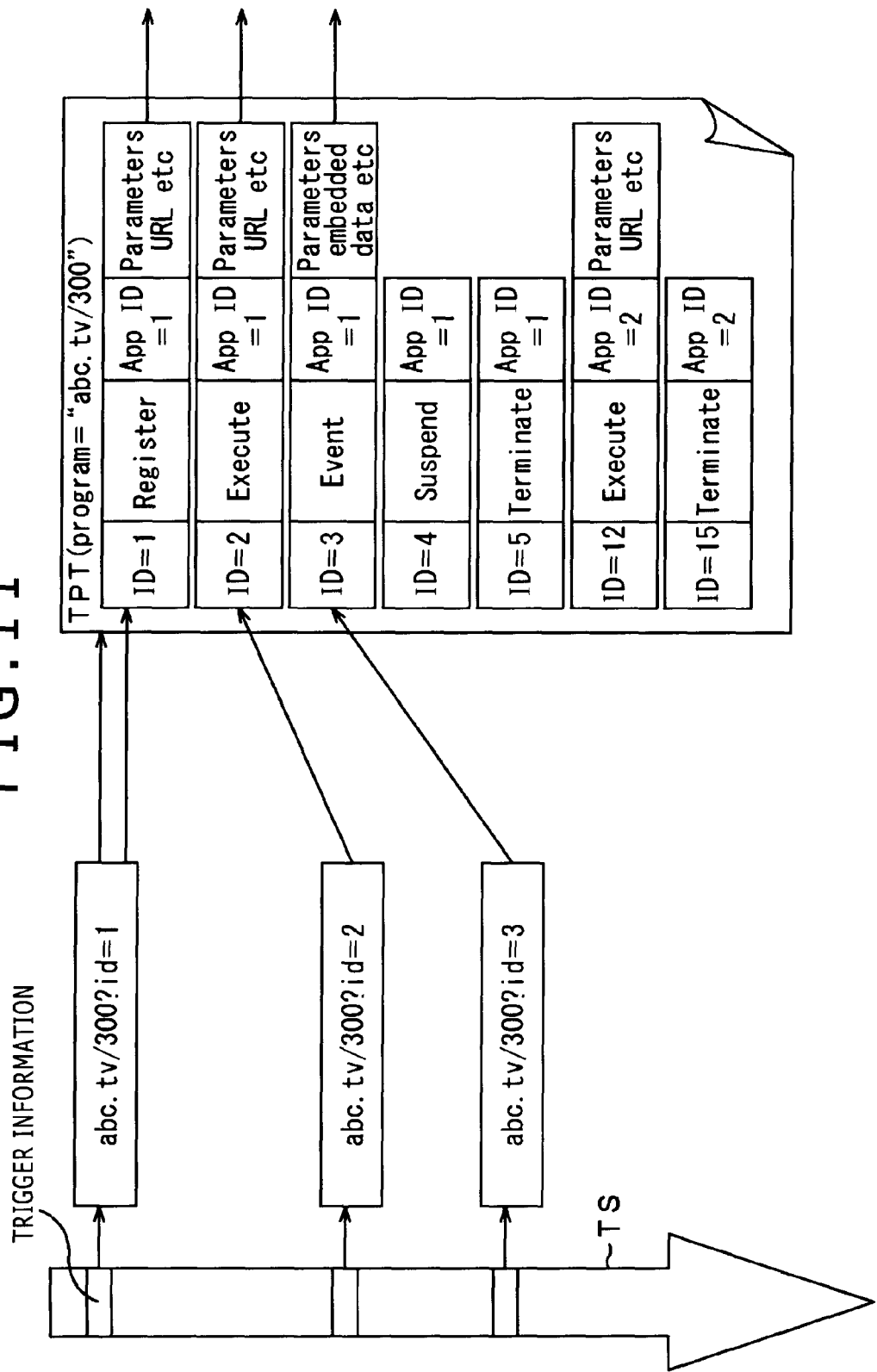

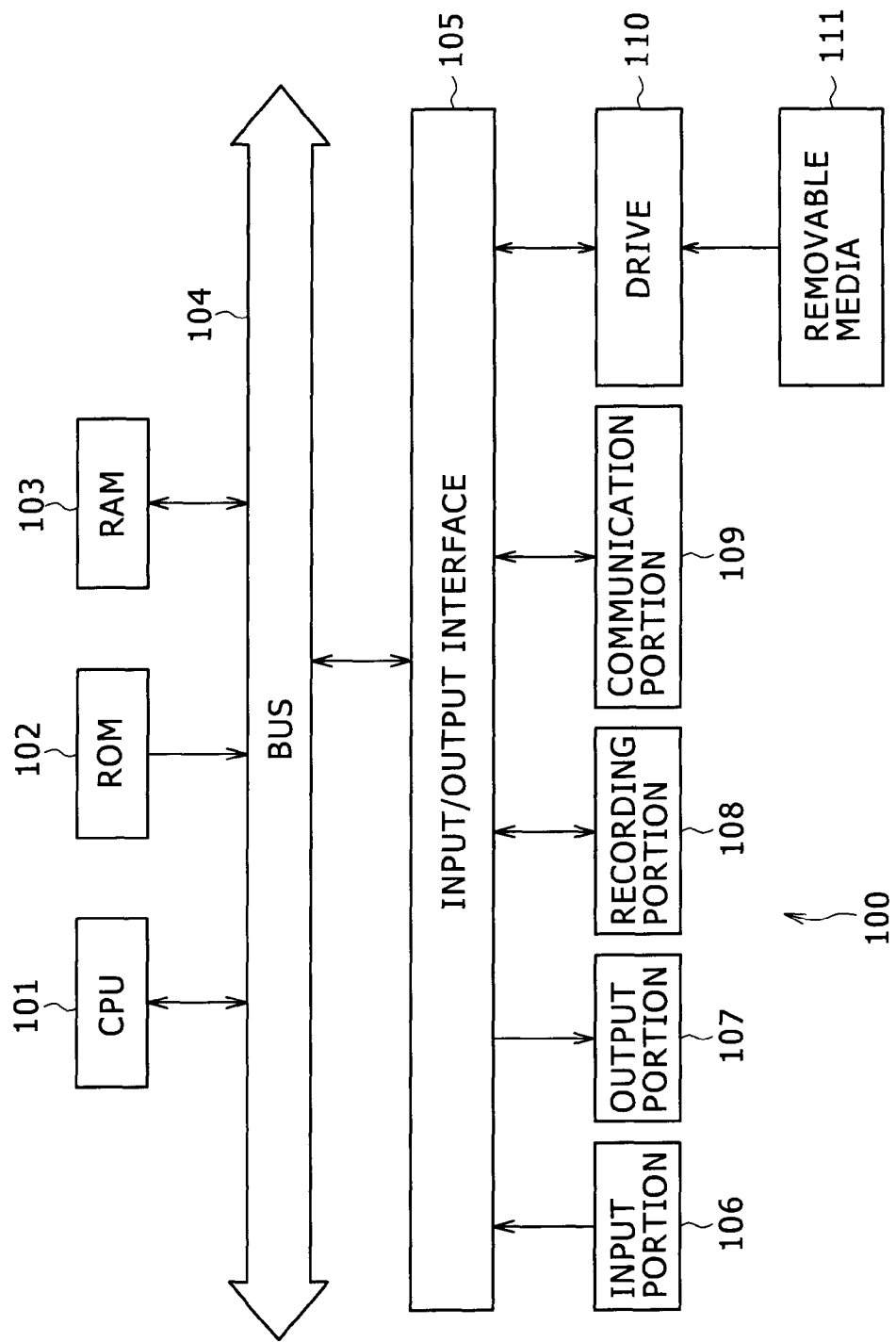

RECEPTION APPARATUS, RECEPTION METHOD, PROGRAM, AND INFORMATION PROCESSING SYSTEM

CROSS-REFERENCE TO RELATED APPLICATION

This application claims the benefit of priority of Provisional Application Ser. No. 61/531,360, filed on Sep. 6, 2011, the entire content of which is incorporated herein by reference.

BACKGROUND

This technology relates to a reception apparatus, a reception method, a program, and an information processing system. More particularly, this technology relates to a reception apparatus, a reception method, a program, and an information processing system for providing application programs executed in interlocked relation to AV (audio video) content such as digital TV (television) programs.

As a service expected to gain widespread acceptance, the reception apparatus for receiving digital TV broadcast signals may acquire from a server on the Internet application programs to be executed in interlocked relation to digital TV programs and execute the application programs thus acquired. Technological studies are now underway to implement such a hybrid service combining broadcasting with communication (e.g., see Japanese Patent Laid-open No. 2006-245653).

SUMMARY

When the reception apparatus receives digital TV broadcast signals not directly but via broadcast transmission channels such as a CATV (cable television) network or a satellite communication network, implementing the service of executing application programs in interlocked relation to digital TV programs requires the reception apparatus to be notified of information about the service in question via the broadcast transmission channels and a dedicated terminal.

In that case, broadcast transmission channel equipments and dedicated terminals need to be renovated. It is also necessary to obtain permission from the broadcast operator relaying TV programs. Thus there has been the need to provide application programs that can be executed in interlocked relation to digital TV programs without recourse to such work. At present, however, technical systems have yet to be established to provide such application programs for execution in interlocked relation to audio video content such as digital TV programs.

In view of the above circumstances, this technology has been made to provide application programs to be executed in interlocked relation to audio video content such as digital TV programs.

According to a first embodiment of this technology, there is provided a reception apparatus including: a reception portion configured to receive audio video content; a trigger extraction portion configured to extract trigger information for operating an application program transmitted along with the audio video content and executed in interlocked relation to the audio video content; a table acquisition portion configured to acquire a correspondence table for associating the trigger information with commands for controlling the operation of the application program; a command determination portion configured such that, based on the acquired correspondence table, the command determination portion determines the commands associated with the extracted trigger information; and a control portion configured to control the operation of the application program in response to the determined commands.

Preferably, the reception apparatus of this technology may further include an output portion configured to output the audio video content, or the audio video content as well as the application program; wherein the table acquisition portion may acquire the correspondence table if the audio video content being output is changed in substance.

Preferably, the trigger information may include determination information for determining an information processing apparatus providing the correspondence table and first identification information for identifying the audio video content; and if the determination information or the first identification information included in the extracted trigger information is changed, the table acquisition portion may acquire the correspondence table from the information processing apparatus in accordance with the determination information and the first identification information.

Preferably, the correspondence table may further associate the trigger information and the commands with second identification information for identifying the application program; and the command determination portion may determine the commands associated with the trigger information regarding each of the application programs identified by the second identification information associated with the extracted trigger information.

Preferably, the control portion may control the operation of one or a plurality of the application programs in response to the determined commands.

Preferably, the trigger information may further include information indicative of the probability of the trigger information itself becoming effective; and if the trigger information becomes effective, the control portion may control the operation of the application program in response to the commands.

The commands may designate acquisition or registration, acquisition or activation, firing of an event, suspension of the application program, or termination of the application program; and in response to each of the commands, the control portion may control acquisition or registration, acquisition or activation of the application program, firing of an event into the currently executing application program, suspension, or termination of the currently executing application program.

Also according to the first embodiment of this technology, there is provided a reception method or a program functionally corresponding to the above-outlined reception apparatus according to the first embodiment of this technology.

Where the reception apparatus, reception method, and program according to the first embodiment of this technology are in use, audio video content is received; trigger information is extracted for operating an application program transmitted along with the audio video content and executed in interlocked relation to the audio video content; a correspondence table is acquired for associating the trigger information with commands for controlling the operation of the application program; based on the acquired correspondence table, the commands associated with the extracted trigger information are determined; and the operation of the application program is controlled in response to the determined commands.

The reception apparatus may be an independent apparatus or an internal block constituting part of a single apparatus.

According to a second embodiment t of this technology, there is provided an information processing system including a reception apparatus, a first information processing apparatus, and a second information processing apparatus. The reception apparatus includes a reception portion configured to receive audio video content; a trigger extraction portion configured to extract trigger information for operating an application program transmitted along with the audio video content and executed in interlocked relation to the audio video content; a table acquisition portion configured to acquire from the first information processing apparatus a correspondence table for associating the trigger information with commands for controlling the operation of the application program; a command determination portion configured to determine, based on the acquired correspondence table, the commands associated with the extracted trigger information; and a control portion configured to control the operation of the application program acquired from the second information processing apparatus in response to the determined commands. The first information processing apparatus includes a first provision portion configured to provide the correspondence table in response to a query from the reception apparatus. The second information processing apparatus includes a second provision portion configured to provide the application program in response to a query from the reception apparatus.

Where the information processing system according to the second embodiment of this technology is in use, the reception apparatus receives audio video content, extracts trigger information for operating an application program transmitted along with the audio video content and executed in interlocked relation to the audio video content, acquires from the first information processing apparatus a correspondence table for associating the trigger information with commands for controlling the operation of the application program; based on the acquired correspondence table, determines the commands associated with the extracted trigger information, and controls the operation of the application program acquired from the second information processing apparatus in response to the determined commands; the first information processing apparatus provides the correspondence table in response to a query from the reception apparatus; and the second information processing apparatus provides the application program in response to a query from the reception apparatus.

According to the first and the second embodiments of this technology, it is possible to provide application programs for execution in interlocked relation to audio video content such as digital TV programs.

BRIEF DESCRIPTION OF THE DRAWINGS

FIG. 3 is a schematic view showing operations of component apparatuses making up the broadcasting system;

FIG. 6 is a schematic view showing a specific layout of the trigger information in a PCR packet;

FIG. 7 is a schematic view showing typical items included in the trigger information;

FIG. 8 is a schematic view showing a typical description of the trigger information;

FIG. 9 is a schematic view showing typical detail specifications of a TPT;

FIG. 10 is a schematic view showing a typical description of the TPT;

FIG. 11 is a schematic view showing typical relations of correspondence between trigger information and commands;

FIG. 17 is a schematic view showing a typical structure of a computer.

DETAILED DESCRIPTION OF THE PREFERRED EMBODIMENTS

Some preferred embodiments of this technology will now be described below in reference to the accompanying drawings.

First Embodiment

[Typical Configuration of a Broadcasting System]

Figure 1:
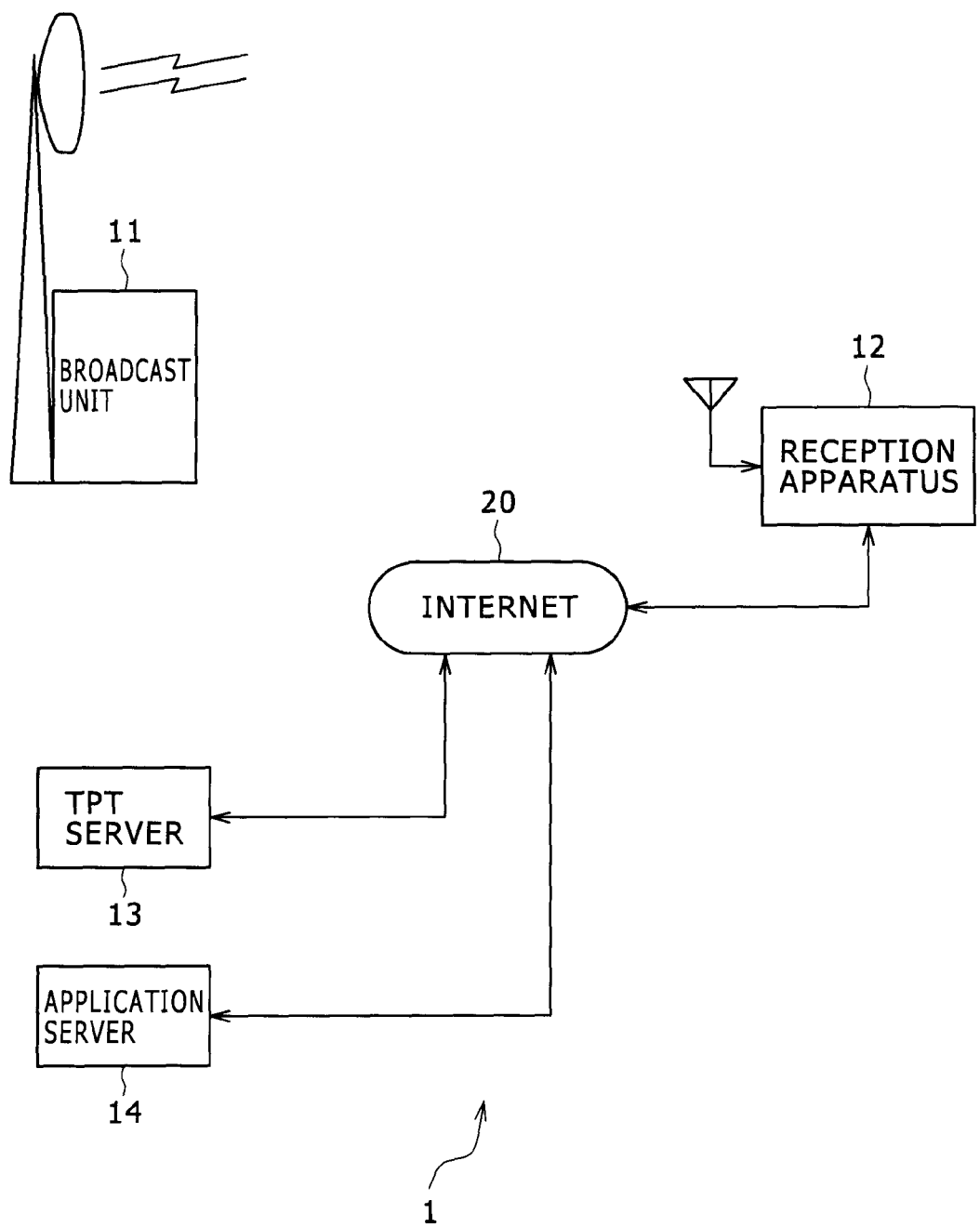
FIG. 1 is a schematic view showing a typical configuration of a broadcasting system.

FIG. 1 shows a broadcasting system 1 as an embodiment of this technology. The broadcasting system 1 is made up of a broadcast unit 11, a reception apparatus 12, a TPT server 13, and an application server 14. The reception apparatus 12, the TPT server 13, and the application server 14 are interconnected via the Internet 20.

The broadcast unit 11 is designed to transmit digital TV broadcast signals of audio video content such as digital TV programs and CMs (commercial messages). In the ensuing description, emphasis will be placed on digital TV programs as a typical example of audio video content.

Also, the broadcast unit 11 transmits trigger information as part of the digital TV broadcast signals, the trigger information being devised to operate a data broadcast application executed in interlocked relation to a digital TV program. The data broadcast application is an application program intended for data broadcasting purposes and executed in interlocked relation to the digital TV program.

The trigger information, when transmitted, is inserted into video or audio signals of the digital TV program or placed into transport streams (referred to as TS hereinafter) of the digital TV broadcast signals. The trigger information will be discussed later in detail by referring to FIGS. 4A and 4B to 8.

The reception apparatus 12 receives the digital TV broadcast signals transmitted from the broadcast unit 11, thereby acquiring images and sounds of the digital TV program. The reception apparatus 12 outputs the acquired images to a display device and the sounds to speakers.

The reception apparatus 12 may exist as a stand-alone unit or as a built-in unit in a TV set or in a video recorder, for instance. A detailed structure of the reception apparatus 12 will be discussed later in reference to FIG. 2.

Also, in response to the trigger information from the broadcast unit 11, the reception apparatus 12 may access the TPT server 13 via the Internet 20 to acquire a TPT.

The TPT server 13 is a server which manages TPTs and which is offered for example by a broadcast operator or the like broadcasting digital TV programs using the broadcast unit 11. A TPT (trigger parameter table) is a correspondence table that associates trigger information with commands for controlling data broadcast applications. In response to a query from the reception apparatus 12, the TPT server 13 provides a TPT under its management to the reception apparatus 12 via the Internet 20.

Based on the TPT acquired from the TPT server 13, the reception apparatus 12 determines the command corresponding to the trigger information from the broadcast unit 11. And in response to the command thus determined, the reception apparatus 12 controls the operation of the data broadcast application. Also, in response to the determined command, the reception apparatus 12 accesses the application server 14 via the Internet 20 to acquire the data broadcast application.

The application server 14 is a server which is offered for example by a broadcast operator or the like broadcasting digital TV programs using the broadcast unit 11 and which manages the data broadcast applications executed in interlocked relation to the digital TV program broadcasted by the broadcast unit 11. In response to a query from the reception apparatus 12, the application server 14 provides a data broadcast application under its management to the reception apparatus 12 via the Internet 20.

The broadcasting system 1 is structured as explained above.

[Typical Structure of the Reception Apparatus]

Figure 2:
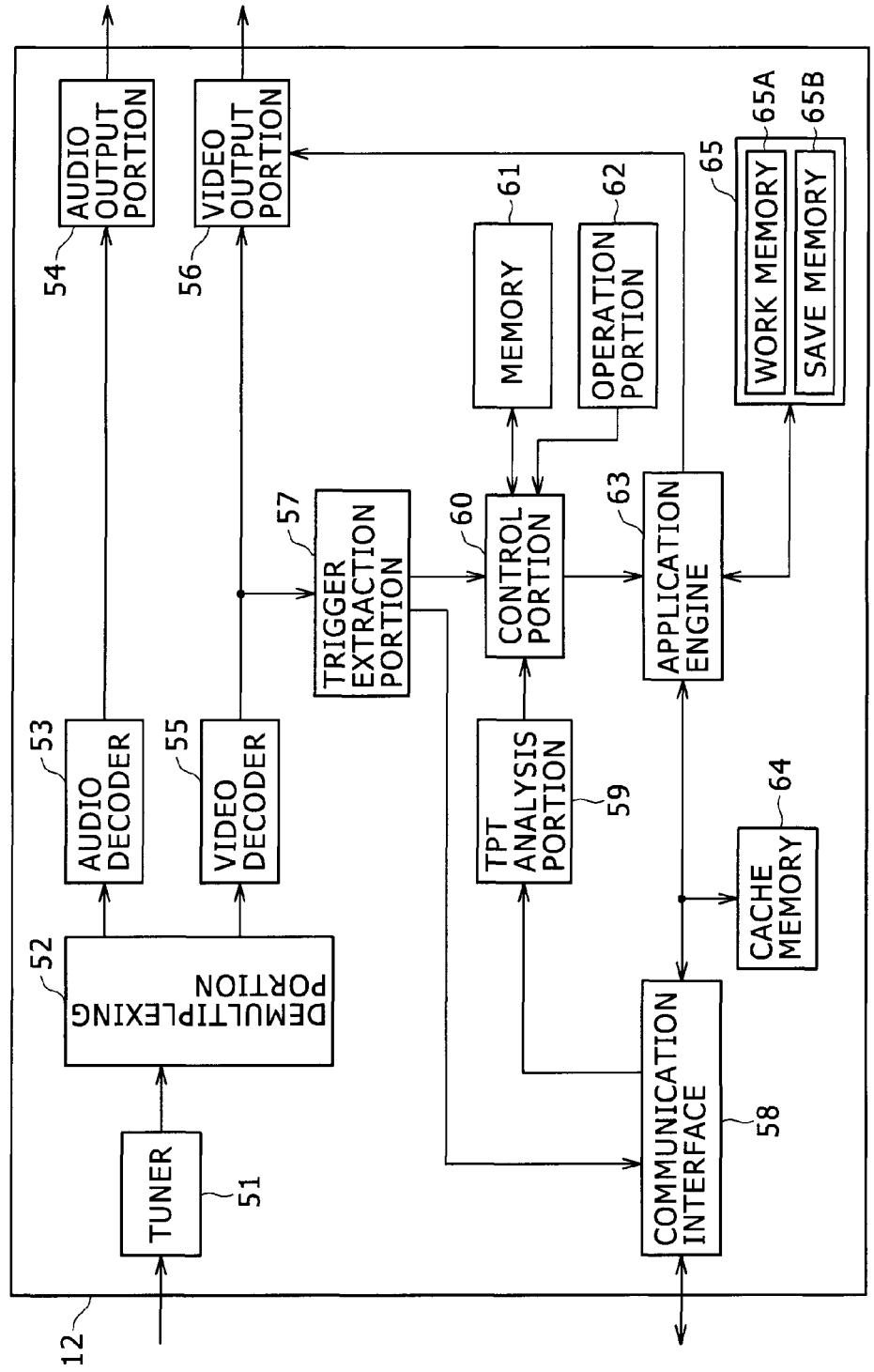
FIG. 2 is a schematic view showing a typical structure of a reception apparatus.

FIG. 2 shows a typical structure of the reception apparatus 12 included in FIG. 1.

The reception apparatus 12 is made up of a tuner 51, a demultiplexing portion 52, an audio decoder 53, an audio output portion 54, a video decoder 55, a video output portion 56, a trigger extraction portion 57, a communication interface (I/F) 58, a TPT analysis portion 59, a control portion 60, a memory 61, an operation portion 62, an application engine 63, a cache memory 64, and an application memory 65.

The tuner 51 receives the digital TV broadcast signals corresponding to the channel selected by a user, demodulates the received signal, and outputs the resulting TS to the demultiplexing portion 52.

The demultiplexing portion 52 demultiplexes the TS input from the tuner 51 into an audio coded signal and a video coded signal which are output to the audio decoder 53 and the video decoder 55, respectively.

The audio decoder 53 decodes the input audio coded signal, and outputs the resulting audio signal to the audio output portion 54. The audio output portion 54 outputs the input audio signal to downstream speakers.

The video decoder 55 decodes the input video coded signal, and outputs the resulting video signal to the video output portion 56 and the trigger extraction portion 57. The video output portion 56 outputs the video signal input from the video decoder 55 to a downstream display device.

The trigger extraction portion 57 continuously monitors the video signal input from the video decoder 55, extracts the trigger information embedded in the video signal, and supplies the extracted trigger information to the control portion 60.

Although it is assumed here that the trigger information is embedded in the video signal for example, if the trigger information is placed in the TS, then the trigger extraction portion 57 extracts the trigger information from PCR (program clock reference) packets which are input from the demultiplexing portion 52 and which include the trigger information in question. And if the trigger information is embedded in the audio signal, the trigger extraction portion 57 continuously monitors the audio signal input from the audio decoder 53, and extracts the trigger information embedded in the audio signal.

Also, in accordance with the extracted trigger information, the trigger extraction portion 57 controls the communication I/F 58 to access the TPT server 13 via the Internet 20 to request a TPT therefrom. The communication I/F 58 receives the TPT sent from the TPT server 13 via the Internet 20, and feeds the received TPT to the TPT analysis portion 59.

The TPT analysis portion 59 acquires the TPT from the communication I/F 58. The TPT analysis portion 59 analyzes the acquired TPT before placing it into an internal memory (not shown) for storage. Also, in response to a request from the control portion 60, the TPT analysis portion 59 supplies the control portion 60 with the TPT held in the memory.

The control portion 60 controls the operations of the components constituting the reception apparatus 12 by executing control programs stored beforehand in the memory 61. The memory 61 retains in advance the control programs to be executed by the control portion 60. The control programs may be appropriately updated based on the digital TV broadcast signal or on update data acquired via the Internet 20. The operation portion 62 accepts various operations from the user, and notifies the control portion 60 of operation signals corresponding to the accepted operations.

Also, based on the TPT from the TPT analysis portion 59, the control portion 60 determines the command corresponding to the trigger information from the trigger extraction portion 57. In response to the command thus determined, the control portion 60 may control acquisition or registration of a data broadcast application, acquisition or execution of the application, event firing in the application, suspension of the application, termination of the application, or the like.

The application engine 63 under control of the control portion 60 controls the communication I/F 58 to access the application server 14 via the Internet 20 to request a data broadcast application from the application server 14. The communication I/F 58 receives the data broadcast application sent from the application server 14 via the Internet 20, and retains the received data broadcast application in the cache memory 64.

The application engine 63 under control of the control portion 60 reads the data broadcast application held in the cache memory 64 and executes the retrieved data broadcast application. The video signal of the currently executing data broadcast application is fed to the video output portion 56.

The video output portion 56 combines the video signal input from the application engine 63 with the video signal input from the video decoder 55, and outputs the combined signal to the downstream display device.

The application memory 65 is composed of a work memory 65A and a save memory 65B. The application engine 63 records to the work memory 65A the data about the currently executing data broadcast application (specifically, the data may include the layer of the currently displayed information). When suspending the currently executing data broadcast application, the application engine 63 moves the data held in the work memory 65A of the application memory 65 into the save memory 65B. And when reactivating the suspended data broadcast application, the application engine 63 moves the data held in the save memory 65B into the work memory 65A so as to restore the state in effect before the suspension.

The reception apparatus 12 is structured as explained above.

[Operations of the Components of the Broadcasting System]

Explained next in reference to FIG. 3 is an outline of the operations of the components making up the broadcasting system 1.

In the broadcasting system 1 of FIG. 3, the broadcast unit 11 transmits (S1) the digital TV broadcast signal of a digital TV program (indicated as "Content" in the drawing) including trigger information (indicated as "Trigger" in the drawing). The digital TV broadcast signal also includes metadata (indicated as "Metadata" in the drawing) about the digital TV program in question.

When receiving the digital TV broadcast signal from the broadcast unit 11 via a CATV network or a satellite communication network, the reception apparatus 12 receives (S2) a signal resulting from conversion by a dedicated terminal such as a set-top box 15 (indicated as "STB (Set Top Box)" in the drawing) through an HDMI (High Definition Multimedia Interface). In this case, the output from the set-top box 15 includes only the digital TV program and trigger information; the reception apparatus 12 cannot use the metadata.

That is, besides the case in which the digital TV broadcast signal is directly received (S1), the reception apparatus 12 can also extract the trigger information transmitted together with the digital TV broadcast signal when the signal is received via the set-top box 15 (S2). And the reception apparatus 12 determines whether or not to acquire a TPT based on server determination information for determining the TPT server 13 or on content identification information for identifying audio video content, the information being included in the extracted trigger information. Incidentally, the server determination information corresponds to a domain_name to be discussed later in reference to FIG. 7, and the content identification information corresponds to a program_id in FIG. 7.

When deciding to acquire a TPT, the reception apparatus 12 accesses the TPT server 13 via the Internet 20 to request the TPT therefrom (S3).

For example, suppose that the user at the reception apparatus 12 changes the channel of the currently selected digital TV program to another. In that case, the server determination information included in the trigger information varies from one broadcast operator to another broadcasting the programs before and after the channel change. Because the channel change renders the server determination information different, the reception apparatus 12 determines to acquire the TPT, and requests the TPT regarding the channel or program following the channel or program change from the TPT server 13.

As another example, suppose that one digital TV program has ended and another digital TV program has started on the same channel in the reception apparatus 12. In that case, the content identification information included in the trigger information varies from one program to another before and after the program change. Because the program change renders the content identification information different, the reception apparatus 12 determines to acquire the TPT, and requests the TPT regarding the program or channel following the program or channel change from the TPT server 13.

In the foregoing examples, it was explained that the TPT is acquired following the channel or program change. Alternatively, the reception apparatus 12 may acquire TPTs using other timings. That is, when the content of the currently selected digital TV program is changed, the reception apparatus 12 requests a TPT reflecting the changed content from the TPT server 13.

In response to a query from the reception apparatus 12, the TPT server 13 determines the TPT and transmits (S4) the determined TPT (indicated as "TPT" in the drawing) to the reception apparatus 12 via the Internet 20. The reception apparatus 12 receives the TPT from the TPT server 13 via the Internet 20 and retains the received TPT.

More specifically, the TPT server 13 manages the TPTs corresponding to each of diverse pieces of audio video content such as digital TV programs and CMs. The TPT server 13 determines the TPT corresponding to the audio video content identified by the content identification information or the like included in the TPT request from the reception apparatus 12, and transmits the TPT thus determined to the reception apparatus 12.

For example, the TPT server 13 determines the TPT corresponding to the digital TV program broadcast by the broadcast operator offering the TPT server 13, within a predetermined time period (e.g., several hours, one day, or the like) following the time the digital TV program identified by the content identification information or the like from the reception apparatus 12 is started, and transmits the determined TPT to the reception apparatus 12. This allows the reception apparatus 12 to acquire the TPTs regarding all programs broadcast within the predetermined time period by the broadcast operator corresponding to the channel in effect after the channel change.

As another example, the TPT server 13 determines the TPT corresponding to the digital TV program identified by the content identification information or the like from the reception apparatus 12, and transmits the TPT thus determined to the reception apparatus 12. In this manner, the reception apparatus 12 acquires the TPT regarding the program in effect after the program change.

That is, when the content of the currently selected digital TV program is changed, the reception apparatus 12 acquires the TPT corresponding to the changed content only once.

And when the trigger information is extracted from the broadcast unit 11, the reception apparatus 12 references the TPT it retains so as to determine the command corresponding to the trigger information in question. In response to the command thus determined, the reception apparatus 12 accesses the application server 14 via the Internet 20, and requests therefrom (S5) the data broadcast application to be executed in interlocked relation to the currently selected digital TV program.

In response to a query from the reception apparatus 12, the application server 14 transmits (S6) the data broadcast application (indicated as "Application" in the drawing) to the reception apparatus 12 via the Internet 20. The reception apparatus 12 acquires the data broadcast application from the application server 14 via the Internet 20 and activates the acquired application.

If the trigger information is extracted during execution of the data broadcast application, the reception apparatus 12 determines the command corresponding to the extracted trigger information by use of the TPT. And the data broadcast application is subjected to such operations as event firing, suspension, termination, etc., depending on the determined command.

In the broadcasting system 1, as explained above, the reception apparatus 12 operates in interlocked relation to the TPT server 13 and application server 14 in accordance with the trigger information from the broadcast unit 11. This allows the reception apparatus 12 to acquire and execute the data broadcast application executed in interlocked relation to the currently selected digital TV program. Also, the trigger information from the broadcast unit 11 may be sent to the reception apparatus 12 via a dedicated terminal such as the set-top box 15. This means that the broadcasting system 1 can provide data broadcast applications without renovating the broadcast transmission channel equipment such as a CATV network or the dedicated terminal and without obtaining permission from the relaying broadcast operator.

[Method for Transmitting the Trigger Information]

Explained next is a method for transmitting trigger information.

Figure 4B:
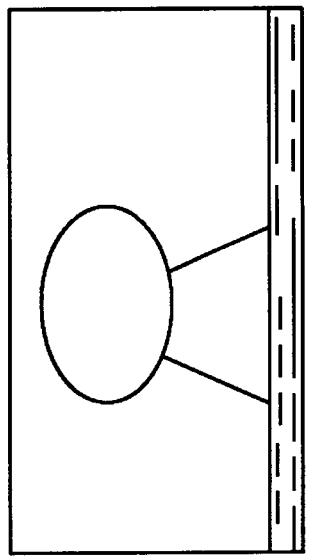
FIGS. 4A and 4B are schematic views each showing an example in which trigger information is embedded into a video signal.
Figure 4A:
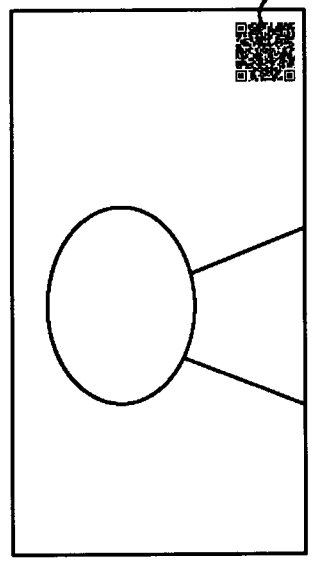

FIGS. 4A and 4B show two examples in which trigger information is embedded into the video signal of a digital TV program.

FIG. 4A shows an example in which trigger information is turned into a two-dimensional barcode that is superposed onto a predetermined position of a video signal image (at the bottom right corner in this example). FIG. 4B shows an example in which trigger information is turned into a video code that is superposed onto several lines at the bottom of the video signal image. The trigger information shown in FIGS. 4A and 4B is extracted by the trigger extraction portion 57 of the reception apparatus 12.

In both examples in FIGS. 4A and 4B, the trigger information is placed on the video of the digital TV program, so that the trigger information may be informed to reception apparatuses such as those utilizing CATV networks or satellite communication networks (e.g., reception apparatus 12 in FIG. 3).

Also in both examples in FIGS. 4A and 4B, the trigger information superposed on the video (two-dimensional barcode or video code) can be recognized visually by the user of the reception apparatus 12. If that is not desirable, the trigger information superposed on the video may be masked using the same pixels as those surrounding the information before it is displayed.

Although FIGS. 4A and 4B show examples in which the trigger information is embedded in the video signal of the digital TV program, this is not limitative of the position where the trigger information is placed or of the method for transmitting the trigger information, as explained above. In another example, the trigger information may be placed in PCRs of the TS.

Figure 5:
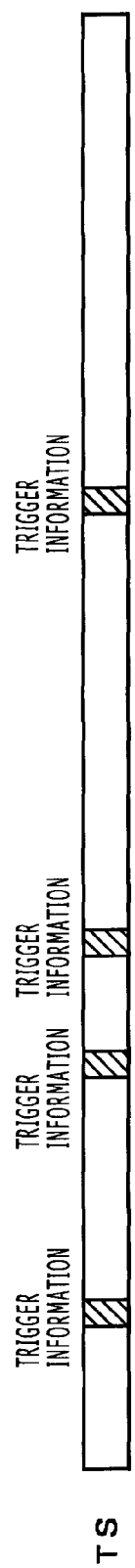
FIG. 5 is a schematic view showing the concept of transmitting the trigger information included in PCR packets of a TS.

FIG. 5 shows the concept of transmitting the trigger information placed in PCR packets of the TS carrying a digital TV broadcast signal.

As shown in FIG. 5, not all PCR packets accommodate the trigger information; the trigger information may be placed into PCR packets only in a suitably timed manner permitting interlocking with the digital TV program. Usually, PCR packets pass through the PID filter of a CATV retransmission unit, so that the trigger information may also be informed to reception apparatuses utilizing CATV networks or satellite communication networks (e.g., reception apparatus 12 in FIG. 3). Also, the trigger information may be placed in the user data region of a video coded stream or an audio coded stream.

Furthermore, one trigger information is transmitted consecutively several times in consideration of radio interference, a capture failure (reception miss) of the reception apparatus 12 or the like.

FIG. 6 shows the position where trigger information is held in a PCR packet. The PCR packet is a TS packet with its adaptation_field holding a PCR. The trigger information (Trigger Info_descriptor) is held in a transport_private_data_byte following the PCR. When the trigger information is held this way, a transport_private_data_flag among Various_flags in front of the PCR is set to 1.

[Details of the Trigger Information]

Explained next are details of trigger information. FIG. 7 shows typical information items included in the trigger information.

A "domain_name" is information for determining the TPT server 13. For example, the domain_name specifies information indicative of the domain name of the TPT server 13. That is, the TPT server 13 is provided by business operators such as the broadcast operator broadcasting digital TV programs using the broadcast unit 11. Thus the domain_name varies from one business operator to another.

A program_id is information for identifying audio video content such as a digital TV program. That is, the reception apparatus 12 informs the program_id included in the trigger information to the TPT server 13, so that the TPT server 13 can identify the digital TV program for determining the TPT based on the program_id from the reception apparatus 12.

As explained above, the domain_name corresponds to server determination information and the program_id corresponds to content identification information.

A trigger_id is information for identifying this trigger information. Also, the trigger_id designates a specific command.

A trigger_validity is information indicative of the probability of this trigger information becoming valid. A server access dispersion parameter value N is set as this information, the value N indicating the probability that each reception apparatus 12 having received this trigger information performs its processing in accordance with the received trigger information. Setting this value makes it possible to disperse the attempts by a plurality of reception apparatuses 12 to access the TPT server so as to acquire TPTs therefrom, the access attempts not being concentrated on a limited period.

For example, if it is desired to disperse the access attempts from potentially numerous reception apparatuses 12 to the TPT server 13 into four times, the same trigger information is transmitted four times and the inverse of the probability is designated in the trigger_validity using an integer. That is, the server access dispersion parameter value N may be set to 4 for the first trigger information, to 3 for the second trigger information, to 2 for the third trigger information, and to 1 for the fourth trigger information.

Furthermore, the trigger_validity is an optional item, so that the trigger_validity may be designated only if the attempts to access the TPT server 13 are desired to be dispersed. And if the item trigger_validity is not designated in the trigger information, the reception apparatus 12 regards the server access dispersion parameter value N as 1 and considers that this trigger information is valid.

[Typical Description of the Trigger Information]

FIG. 8 is a schematic view showing a typical description of the trigger information.

As shown in FIG. 8, the trigger information is typically made up of the domain_name, program_id, trigger_id, and a value for designating trigger_validity indicated in FIG. 7, as well as a character string concatenating predetermined characters such as "/," "?id=" and the like. For example, if the domain_name is "abc.tv," the program_id is "300," and the trigger_id is "1," then the character string indicative of the trigger information is "abc.tv/300?id=1."

That is, attaching "http://" to the beginning of this character string constitutes a character string "http://abc.tv/300?id=1" indicative of the URL (Uniform Resource Locator) at which to access the TPT server 13. Also, because this URL is suffixed with a query character string id=<trigger_id>, the TPT server 13 can obtain the parameter involved by use of the GET method under HTTP (HyperText Transfer Protocol). And if the trigger_id indicates a specific value for example, the TPT server 13 can transmit to the reception apparatus 12 the TPT determined in accordance with the parameter value.

Since the trigger_validity is an optional item as explained above, a character string vrate=<trigger_validity> is included in the trigger information and attached to the URL as the query character string only if the trigger_validity is set.

The method for describing the trigger information is arbitrary and not limited to the description example shown in FIG. 8.

The trigger information is structured as explained above.

[Details of the TPT]

Explained next are details of the TPT. FIG. 9 is a schematic view showing typical detailed specifications of a TPT.

As shown in FIG. 9, the TPT is primarily composed of tpt elements and command elements.

In the tpt element, information about the TPT is described. The tpt element includes a program attribute.

In the program attribute, information for identifying the TPT is designated. For example, in the program attribute, a character string concatenating domain_name and program_id using "/" is designated.

That is, the control portion 60 compares the values of domain_name and program_id included in the extracted trigger information with the values of the program attribute in the retained TPT and, only if these values match, determines the command corresponding to the trigger information. For example, although radio interference or capture failure (reception miss) on the reception apparatus 12 may have prevented the reception apparatus 12 from retaining the appropriate TPT, the control portion 60 can reliably determine the expected command by checking whether domain_name and program_id match in determining the command.

In the command element, information about the command is described. The command element includes an id attribute, a destination attribute, and an action attribute.

In the id attribute, information for identifying the command is designated. Furthermore, in the id attribute, the value corresponding to trigger_id included in the trigger information is designated.

In the destination attribute, the device targeted for data broadcast application control exercised by this command is designated. Here, if an external device is connected to the reception apparatus 12 besides the reception apparatus body (reception apparatus 12), the external device is designated as a command target device. For example, in the destination attribute, "receiver" is designated if the reception apparatus 12 is the command target device, and "external_1" or "external_2" is designated if the external device is the command target device. If the destination attribute is not designated, "receiver" is assumed to be designated.

The action attribute indicates that this command is one of the commands "execute," "register," "suspend," "terminate," and "event."

The execute command (execute) is a command that orders the reception apparatus 12 to acquire or activate the data broadcast application.

The register command (register) is a command that orders the reception apparatus 12 to acquire or register the data broadcast application. Here, registration of the data broadcast application means associating the acquired data broadcast application with its priority and expiration date which are then stored. The data broadcast application is managed by the control portion 60 in accordance with its priority and preservation date.

The suspend command (suspend) is a command that orders the reception apparatus 12 to suspend the currently executing data broadcast application.

The terminate command (terminate) is a command that orders the reception apparatus 12 to terminate the currently executing data broadcast application.

The event command (event) is a command that orders the reception apparatus 12 to fire an event on the currently executing data broadcast application.

That is, in the action attribute for example, the command "execute" is designated if acquisition or activation of the data broadcast application is ordered; the command "register" is designated if acquisition or registration of the data broadcast application is ordered; the command "suspend" is designated if suspension of the data broadcast application is ordered; the command "terminate" is designated if termination of the data broadcast application is ordered; and the command "event" is designated if an event is fired on the currently executing data broadcast application.

In an application element, information about the data broadcast application is described. The application element includes an id attribute, a type attribute, a url attribute, a priority attribute, and an expire_date attribute.

In the id attribute, an application ID for identifying this data broadcast application is designated. In the type attribute, an application type indicative of information about the file attribute and the like of this data broadcast application is designated. In the url attribute, where the command is the execute or register command, an application URL indicating the location from which to acquire this data broadcast application is designated. Thus the URL of the application server 14 is designated in the url attribute.

In the priority attribute, information indicating the priority for acquiring and retaining the data broadcast application corresponding to this command is designated. In the expire_date attribute, information indicating the expiration date of the data broadcast application is designated. When a data broadcast application is registered, an application expiration date and a retention priority of the data broadcast application are stored. The data broadcast applications are then managed in accordance with these expiration dates and retention priorities.

Furthermore, where the command is the execute or register command, the url attribute and expire_date attribute are mandatory items. Usually, "0" is designated in the priority attribute; if the priority is desired to be higher, "1" is designated.

In an event element, information about the event command is described. The event element includes an id attribute and a data element.

In the id attribute, where the command is the event command, an event ID for identifying the event to be fired on the data broadcast application designated by the application ID is designated. And in the data element, where the command is the event command, event addition data to be referenced upon firing of an event is described.

Furthermore, the event element is a mandatory item if the action attribute is "event."

[Typical Description of the TPT]

FIG. 10 is a schematic view showing a typical description of the TPT.

In the example of FIG. 10, "abc.tv/300" is designated in the program attribute of the tpt element. Specifically, this means, for example, that the TPT is destined for the digital TV program (program_id="300") broadcast by abc broadcasting station (domain_name="abc.tv"). In this tpt element, seven command elements are described, although not all of them are shown for purpose of simplifying the explanation.

In the first command element, "1" is designated as the id attribute, "receiver" is designated as the destination attribute, and "register" is designated as the action attribute. That is, this command (id=1) serves as the register command for the reception apparatus 12. And between the start tag and the end tag of the command element, the application element is described. In the application element, "1" is designated as the id attribute, "html" is designated as the type attribute, "xxx.com/yyy1" is designated as the url attribute, and "2011-01-21" is designated as the expire_date attribute. That is, this application element means that the data broadcast application (id=1) described in HTML (Hyper Text Markup Language) can be acquired from the application server 14 determined by the URL "xxx.com/yyy1."

Likewise, the second command element indicates that this command (id=2) serves as the execute command for the reception apparatus 12. It also means that the data broadcast application (id=1) to be acquired in response to the execute command can be acquired from the application server 14 determined by the URL "xxx.com/yyy1."

The third command element indicates that this command (id=3) serves as the event command for the data broadcast application (id=1) executed by the reception apparatus 12. And between the start tag and the end tag of this command element, the application element and event element are described. In the application element, "1" is designated as the id attribute. And in the event element, "event1" is designated as the id attribute, and "zzzzzzz . . . z" is described as the data element. That is, with an event fired by this command, the data "zzzzzzz . . . z" is used by the data broadcast application.

The fourth command element indicates that this command (id=4) serves as the suspend command for the data broadcast application (id=1) executed by the reception apparatus 12. Furthermore, the fifth command element indicates that this command (id=5) serves as the terminate command for the data broadcast application (id=1) executed by the reception apparatus 12.

The sixth command element indicates that this command (id=12) serves as the execute command for the reception apparatus 12. And in the application element between the start tag and the end tag of the command element, "2" is designated as the id attribute, "html" is designated as the type attribute, "xxx.com/yyy2" is designated as the url attribute, and "2011-01-22" is designated as the expire_date attribute. That is, it means that the data broadcast application (id=2) to be acquired in response to the execute command can be acquired from the application server 14 determined by the URL "xxx.com/yyy2."

Likewise, the seventh command element indicates that this command (id=15) serves as the terminate command for the data broadcast application (id=2) executed by the reception apparatus 12.

The method for describing the TPT is arbitrary and not limited to the description example shown in FIG. 10.

The TPT is structured as explained above.

[Relations of Correspondence Between the Trigger Information and the Commands]

Explained next is an example of processing in which the command associated with the trigger information is determined using the TPT. FIG. 11 is a schematic view showing typical relations of correspondence between the trigger information and the commands.

As shown in FIG. 11, after extracting the trigger information from the video signal obtained from the TS, the reception apparatus 12 determines whether or not to acquire a TPT from the TPT server 13 based on the item domain_name or program_id included in the trigger information.

For example, if the trigger information "abc.tv/300?id=1" is extracted and if the value of the item program_id included in the most recently extracted trigger information is other than "300," which means the program_id has changed, the reception apparatus 12 determines that the TPT is to be acquired. The reception apparatus 12 then acquires the TPT by accessing the TPT server 13 determined by the URL ("http://abc.tv/300?id=1") obtained by adding "http://" to the beginning of the trigger information.

In this manner, the reception apparatus 12 retains the TPT (program="abc.tv/300") shown in FIG. 11. Although the TPT indicated in FIG. 11 corresponds to the above-described TPT in FIG. 10, the TPT in FIG. 11 shows only the id attribute and the action attribute in the command element, the id attribute in the application element, and parameters such as URLs or the like for the purpose of simplifying the explanation.

For example, if the trigger_id included in the first trigger information ("abc.tv/300?id=1") is "1," the reception apparatus 12 determines the register command (Register) corresponding to the id attribute "1" of the command element based on the TPT. And in response to the register command, the reception apparatus 12 acquires and registers the data broadcast application of which the application ID is "1."

Next, if the second trigger information ("abc.tv/300?id=2") is extracted and if the trigger_id included in this trigger information is "2," the reception apparatus 12 determines the execute command (Execute) corresponding to the id attribute "2" of the command element based on the TPT. And in response to the execute command, the reception apparatus 12 executes the acquired data broadcast application.

Later, if the third trigger information ("abc.tv/300?id=3") is extracted and if the trigger_id included in this trigger information is "3," the reception apparatus 12 determines the event command (Event) corresponding to the id attribute "3" of the command element based on the TPT. And in response to the event command, the reception apparatus 12 fires an event on the currently executing data broadcast application.

Thereafter, if further trigger information ("abc.tv/300?id=4") is extracted (not shown in FIG. 11) and if the trigger_id included in this trigger information is "4," the reception apparatus 12 determines the suspend command (Suspend) corresponding to the id attribute "4" of the command element based on the TPT. And in response to the suspend command, the reception apparatus 12 suspends the currently executing data broadcast application. Furthermore, if the execute command (Execute) is determined in accordance with the extracted trigger information, the reception apparatus 12 resumes the currently suspended data broadcast application in response to the execute command.

Later, if further trigger information ("abc.tv/300?id=5") is extracted and if the trigger_id included in this trigger information is "5," the reception apparatus 12 determines the terminate command (Terminate) corresponding to the id attribute "5" of the command element, and terminates the currently executing data broadcast application in response to the terminate command.

In the above-described example, it was shown that the data broadcast application of which the application ID is "1" is acquired and executed. Alternatively, using different application IDs, the reception apparatus 12 can execute a plurality of data broadcast applications. For example, if the data broadcast application executed in interlocked relation to a digital TV program is given the application ID "1" and if the data broadcast application executed in interlocked relation to CMs inserted into the program is given the application ID "2," the reception apparatus 12 can switch the data broadcast application for the program with that for CMs. For example, in the example of the TPT in FIG. 11, where the trigger_id included in the trigger information ranges from "1" to "5," the operation of the data broadcast application for the program is controlled; where the trigger_id included in the trigger information is "12" and "15," the operation of the data broadcast application for CMs is controlled.

As explained above, upon extracting the trigger information coming from the broadcast unit 11, the reception apparatus 12 determines the command corresponding to the extracted trigger information based on the retained TPT, and controls the operation of the data broadcast application in response to the command thus determined.

[State Transitions of the Data Broadcast Application]

Figure 12:
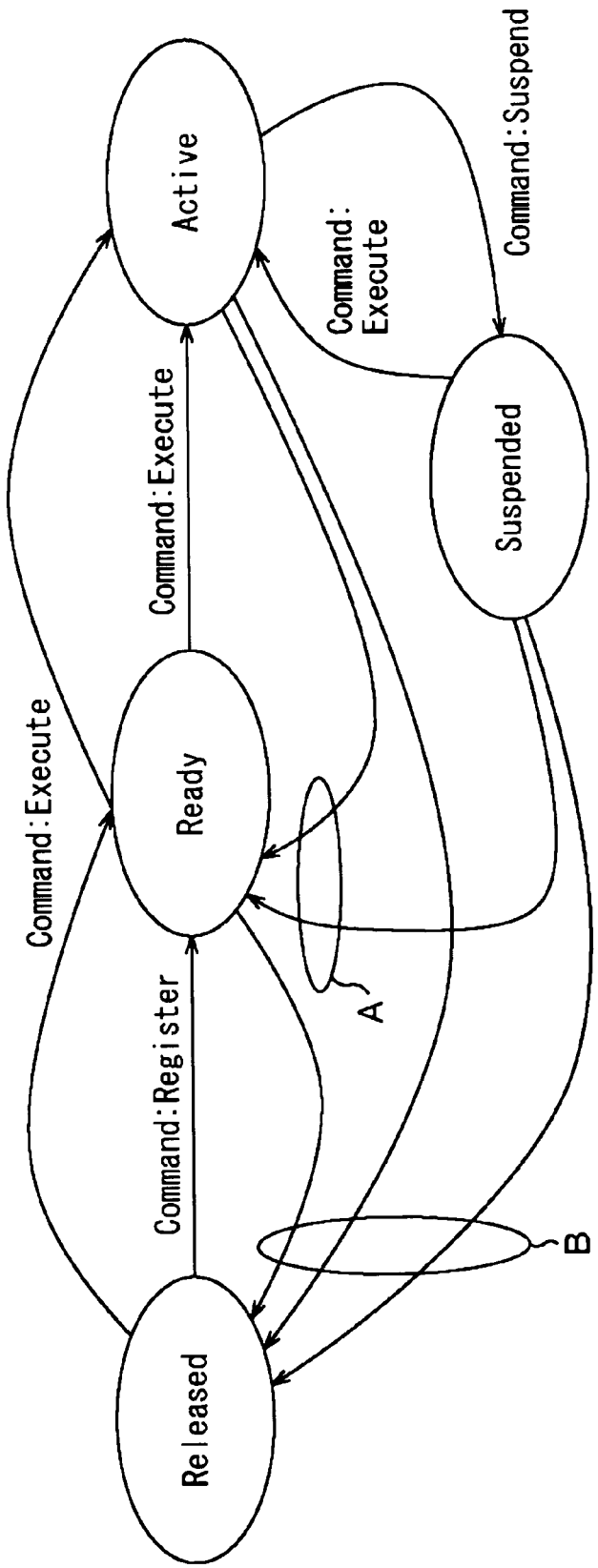
FIG. 12 is a schematic view showing state transitions of a data broadcast application.

FIG. 12 is a state transition diagram of a data broadcast application operated by the reception apparatus 12 in response to each of the register, execute, event, suspend, and terminate commands. As shown in FIG. 12, the state of the data broadcast application is defined to be in one of four states of transition: released state (Released), ready state (Ready), active state (Active), and suspended state (Suspend).

The released state is a state in which the reception apparatus 12 has yet to acquire the data broadcast application. The ready state is a state in which the data broadcast application in question is registered (in the reception apparatus 12) but has yet to be activated. The active state is a state in which the data broadcast application is started and currently executing. The suspended state is a state in which the currently executing data broadcast application has been activated suspended and information indicative of the suspended status is retained in the save memory 65B.

If the register command is received while the data broadcast application is in the released state (i.e., yet to be acquired by the reception apparatus 12), the data broadcast application in question is acquired (registered) in accordance with the register command. This puts the data broadcast application in the ready state.

If the execute command is received while the data broadcast application is in the ready state, the data broadcast application in question is activated in accordance with the execute command. This puts the data broadcast application in the active state.

If the execute command is received while the data broadcast application is in the released state (i.e., yet to be acquired by the reception apparatus 12), the data broadcast application in question is acquired and activated in accordance with the execute command. This puts the data broadcast application in the active state.

If the suspend command is received while the data broadcast application is in the active state, the currently executing data broadcast application is suspended in accordance with the suspend command. This puts the data broadcast application in the suspended state.

If the execute command is received while the data broadcast application is in the suspended state, the suspended data broadcast application is resumed in accordance with the execute command. This puts the data broadcast application in the active state.

If the terminate command is received while the data broadcast application is in the active or suspended state, the currently executing data broadcast application is terminated in accordance with the terminate command. This puts the data broadcast application in the ready state ("A" in FIG. 12). Incidentally, in addition to the transition brought about by the terminate command, the transition to the ready state may also take place in other occasions such as when another data broadcast application is executed.

Also, if the application expiration date of the command expires while the data broadcast application is in the ready, active, or suspended state, the data broadcast application is placed in the released state ("B" in FIG. 12).

Figure 13:
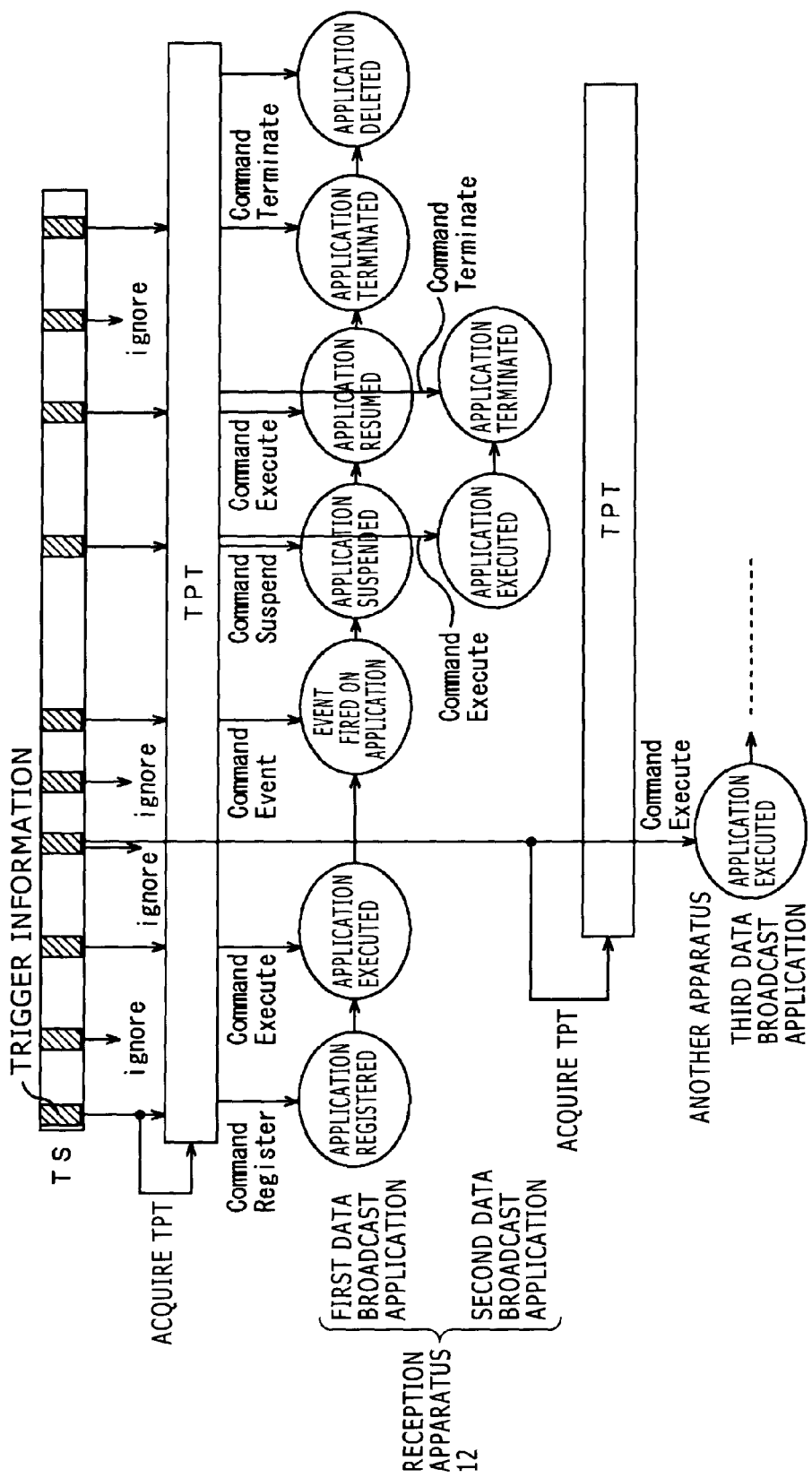
FIG. 13 is a schematic view showing relations between commands and state transitions.

FIG. 13 indicates relations between commands and state transitions.

FIG. 13 schematically shows that the reception apparatus 12 using the TPT determines the commands corresponding to the trigger information transmitted along with the digital TV broadcast signal of a digital TV program and controls the operation of the data broadcast applications in response to the commands thus determined.

The reception apparatus 12 in FIG. 13 executes two data broadcast applications having different application IDs, one of the two applications being called the first data broadcast application to be distinguished from the other application called the second data broadcast application. Another data broadcast application executed by some other device such as an external device connected to the reception apparatus 12 may be called the third data broadcast application. Furthermore, the reception apparatus 12 may not respond to all trigger information extracted; the apparatus ignores ("ignore" in FIG. 13) the trigger information already handled.

If the reception apparatus 12 acquires, retains and registers the first data broadcast application in response to the register command while the first data broadcast application is in the released state (i.e., yet to be acquired by the reception apparatus 12), then the first data broadcast application is placed into the ready state.

If the reception apparatus 12 activates the first data broadcast application in response to the execute command while the first data broadcast application is in the ready state, then the first data broadcast application is placed into the active state.

If some other device acquires and activates the third data broadcast application in response to the execute command while the third data broadcast application is in the released state (i.e., yet to be acquired by the device), then the third data broadcast application is placed into the active state.

If the reception apparatus 12 fires an event on the currently executing first data broadcast application in response to the event command while the first data broadcast application is in the active state, then the first data broadcast application remains in the active state.

If the reception apparatus 12 suspends the currently executing first data broadcast application in response to the suspend command while the first data broadcast application is in the active state, then the first data broadcast application is placed into the suspended state. Also, if the reception apparatus 12 activates the second data broadcast application in response to the execute command for the second data broadcast application different from the first data broadcast application currently in the suspended state, then the second data broadcast application is placed into the active state. That is, if a CM is assumed to be inserted halfway into the digital TV program, for example, then the second data broadcast application for CMs is executed while the first data broadcast application for the program is being suspended.

And if the reception apparatus 12 resumes the suspended first data broadcast application in response to the execute command while the first data broadcast application is in the suspended state, then the first data broadcast application is placed into the active state. Also, if the reception apparatus 12 terminates the currently executing second data broadcast application in response to the terminate command while the second data broadcast application is in the active state, then the second data broadcast application is placed into the ready state. That is, if the CM assumed above to be inserted halfway into the digital TV program is terminated, for example, the program is resumed. This in turn terminates the second data broadcast application for CMs and resumes the currently suspended first data broadcast application for the program.

Also, if the reception apparatus 12 terminates the currently executing first data broadcast application in response to the terminate command while the first data broadcast application is in the active state, then the first data broadcast application is placed into the ready state. Furthermore, if the first data broadcast application is in the ready, active, or suspended state and if the application expiration date of this data broadcast application expires, then this data broadcast application is deleted from the cache memory 64 and registration of the application is erased, whereby the first data broadcast application is placed into the released state.

[Trigger Information Handling Process]

Figure 14:
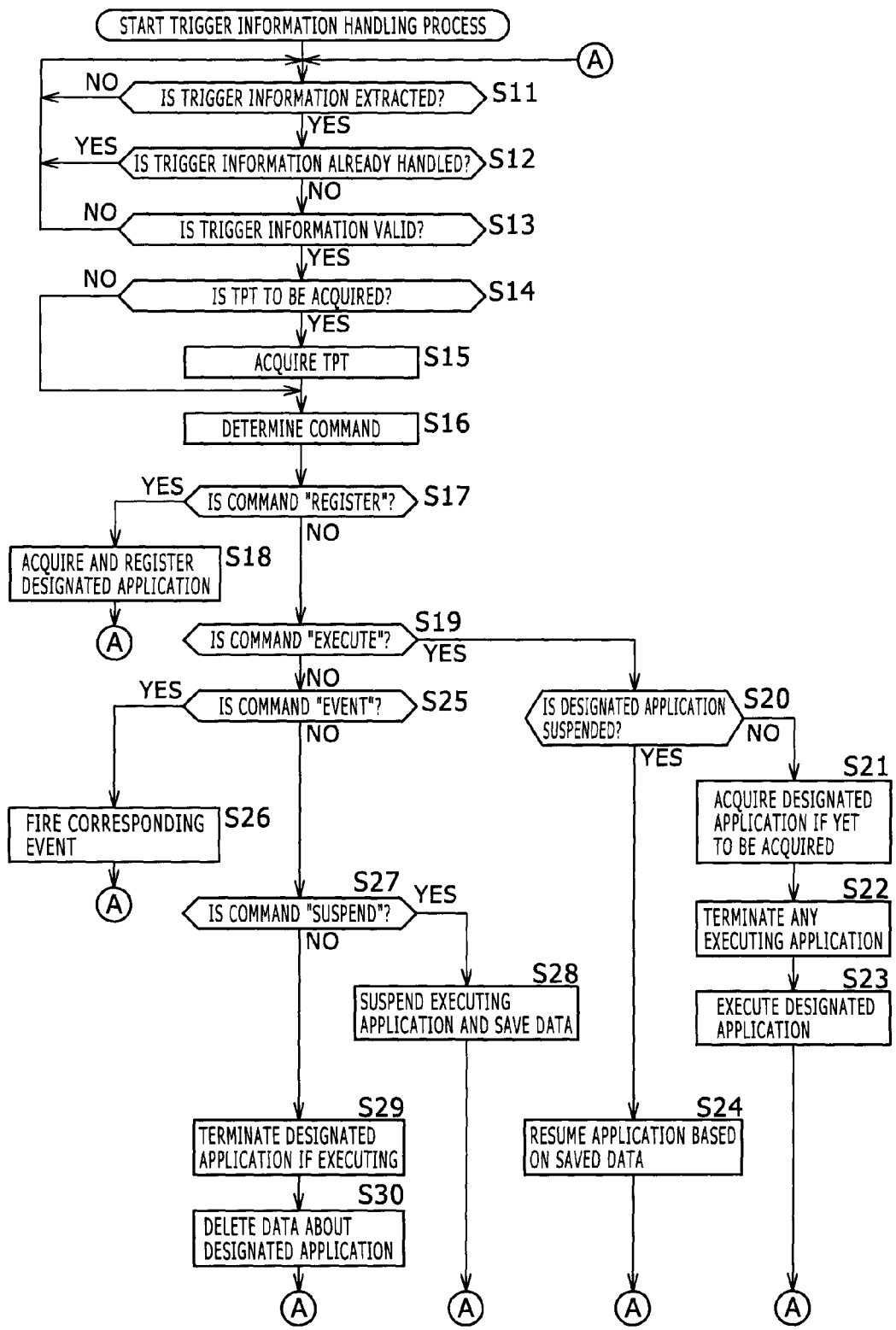
FIG. 14 is a flowchart showing a trigger information handling process.

Explained next in reference to the flowchart of FIG. 14 is the trigger information handling process to be performed by the reception apparatus 12 upon receipt of trigger information.

FIG. 14 is a flowchart explanatory of the trigger information handling process. This trigger information handling process is carried out repeatedly while the user is viewing a digital TV program, i.e., while the reception apparatus 12 is receiving a digital TV broadcast signal.

In step S11, the trigger extraction portion 57 waits until trigger information is extracted from the video signal coming from the video decoder 55. When the trigger information is extracted from the video signal, control is passed on to step S12.

In step S12, the trigger extraction portion 57 analyzes the extracted trigger information so as to determine whether step S13 and subsequent steps have already been performed on (i.e., have handled) the trigger_id included in this trigger information. If it is determined that step S13 and subsequent steps have already been carried out, control is returned to step S11 and the process is repeated from there. If it is determined that step S13 and subsequent steps have yet to be performed on this trigger information, control is passed on to step S13.

In step S13, the trigger extraction portion 57 determines whether this trigger information is valid based on the trigger_validity included in the trigger information. If it is determined that this trigger information is not valid, control is returned to step S11 and the process is repeated from there. If it is determined that this trigger information is valid, then control is passed on to step S14.

In step S14, the trigger extraction portion 57 determines whether or not to acquire a TPT based on the domain_name or program_id included in the trigger information under control of the control portion 60. For example, if the user has changed the channel of the currently selected digital TV program so that the domain_name included in the trigger information has been changed correspondingly, the trigger extraction portion 57 determines that the TPT is to be acquired ("YES" in step S14). And the trigger extraction portion 57 controls the communication I/F 58 and requests the TPT by accessing the TPT server 13 determined by the URL (e.g., "http://abc.tv/300?id=1") that may be acquired by adding "http://" to the beginning of the trigger information, for example. In response to the request from the reception apparatus 12, the TPT server 13 determines the TPT and transmits the determined TPT to the reception apparatus 12.

In step S15, the TPT analysis portion 59 controls the communication I/F 58 to acquire the TPT coming from the TPT server 13. Also, the TPT analysis portion 59 retains the acquired TPT (e.g., TPT in FIG. 10). On the other hand, if it is determined in step S14 that the TPT is not to be acquired, step S15 is skipped and control is passed on to step S16 since the TPT corresponding to the currently selected digital TV program is being held in the TPT analysis portion 59.

In step S16, based on the TPT from the TPT analysis portion 59, the control portion 60 determines that the command corresponding to the trigger information extracted by the trigger extraction portion 57 is the register, execute, terminate, event, or suspend command. More specifically, according to the TPT in FIG. 10 for example, if the trigger_id included in the trigger information is "1" as the command corresponding to this trigger information, the control portion 60 determines that the command is the register command; if the trigger_id is "2," the control portion 60 determines that the command is the execute command. Also according to the TPT in FIG. 10, if the item trigger_id is "3," the control portion 60 determines that the command is the event command; if the trigger_id is "4," the control portion 60 determines that the command is the suspend command; and if the trigger_id is "5," the control portion 60 determines that the command is the terminate command. That is, the TPT is used as a dictionary for determining the command using the trigger_id included in the trigger information.

Upon determining the command, the control portion 60 compares the values of the domain_name and program_id included in the trigger information extracted by the trigger extraction portion 57, with the value of the program attribute in the TPT from the TPT analysis portion 59. Only if these values match, does the control portion 60 determine the command corresponding to the trigger information. If the values do not match, the TPT analysis portion 59 under control of the control portion 60 again accesses the TPT server 13 in order to acquire the TPT corresponding to the currently selected digital TV program. In this manner, even if the appropriate TPT is not retained due to radio interference or the like, the reception apparatus 12 can reliably determine the expected command.

In step S17, the control portion 60 determines whether the result of the determination in step S16 is the register command. If it is determined that the command is the register command, control is passed on to step S18.

In step S18, the control portion 60 controls the communication I/F 58 to access the application server 14 corresponding to the application URL determined by the TPT in order to acquire the data broadcast application determined by the application ID. The data broadcast application acquired by the communication I/F 58 is retained in the cache memory 64. Also, the control portion 60 associates the acquired data broadcast application with its application expiration date and application retention priority, the associated date and priority being stored into the memory 61. In this manner, the data broadcast application held in the cache memory 64 is managed by the control portion 60 in accordance with the expiration date and retention priority of the application.

Thereafter, control is returned to step S11 and the process is repeated from there.

If it is determined in step S17 that the result of the determination in step S16 is not the register command, control is passed on to step S19. In step S19, the control portion 60 determines whether the result of the determination in step S16 is the execute command. If it is determined that the command is the execute command, control is passed on to step S20.

In step S20, the application engine 63 under control of the control portion 60 determines whether the data broadcast application determined by the application ID in the TPT is suspended (i.e., in the suspended state). More specifically, the data broadcast application determined by the application ID is determined to be in the suspended state if data indicative of the application being suspended is saved in the save memory 65B.

If it is determined in step S20 that the data broadcast application determined by the application ID is not suspended, control is passed on to step S21. In step S21, the application engine 63 under control of the control portion 60 acquires the data broadcast application determined by the application ID if the application has yet to be acquired (i.e., not found in the cache memory 64).

In step S22, the application engine 64 under control of the control portion 60 terminates any currently executing data broadcast applications. And in step S23, the application engine 64 under control of the control portion 60 activates the data broadcast application determined by the application ID.

Also in step S20, if it is determined that the data broadcast application determined by the application ID is suspended (i.e., in the suspended state), control is passed on to step S24.

In step S24, the application engine 63 under control of the control portion 60 moves the data held in the save memory 65B to the work memory 65A and activates the data broadcast application determined by the application ID. In this manner, the currently suspended data broadcast application determined by the application ID is resumed from its suspended state. Thereafter, control is returned to step S11 and the process is repeated from there.

If it is determined in step S19 that the result of the determination in step S16 is not the execute command, control is passed on to step S25. In step S25, the control portion 60 determines whether the result of the determination in step S16 is the event command. If it is determined that the command is the event command, control is passed on to step S26.

In step S26, the control portion 60 controls the application engine 63 to fire (i.e., execute) the event corresponding to the event ID of the command on the currently executing data broadcast application only if the application ID determined by the TPT coincides with the application ID of the executing data broadcast application. Thereafter, control is returned to step S11 and the process is repeated from there.

If it is determined in step S25 that the result of the determination in step S16 is not the event command, control is passed on to step S27. In step S27, the control portion 60 determines whether the result of the determination in step S16 is the suspend command. If it is determined that the command is the suspend command, control is passed on to step S28.

In step S28, the application engine 63 under control of the control portion 60 saves into the save memory 65B the data indicative of the status of the currently executing data broadcast application (i.e., data currently written in the work memory 65A, including information indicating the layer of the currently displayed information if the information has a hierarchical structure). Thereafter, control is returned to step S11 and the process is repeated from there.

If it is determined in step S27 that the result of the determination in step S16 is not the suspend command, that means the determination in step S16 points to the terminate command. In this case, control is passed on to step S29.

In step S29, the application engine 63 under control of the control portion 60 terminates the data broadcast application determined by the application ID if the application is currently executing. In step S30, the application engine 63 under control of the control portion 60 deletes from the work memory 65A and save memory 65B the data about the data broadcast application determined by the application ID, and deletes the data broadcast application from the cache memory 64. Thereafter, control is returned to step S11 and the process is repeated from there.

The preceding paragraph completes the explanation of the trigger information handling process. According to the above-described trigger information handling process, it is possible to activate a data broadcast application, fire an event on the data broadcast application, or terminate the data broadcast application in interlocked relation to TV broadcast audio video content (e.g., digital TV programs and CMs). It is also possible to suspend the executing data broadcast application with its execution status retained so as to execute or terminate another data broadcast application, before resuming the suspended data broadcast application from its suspended state.

[Operation Scenario]

Figure 15:
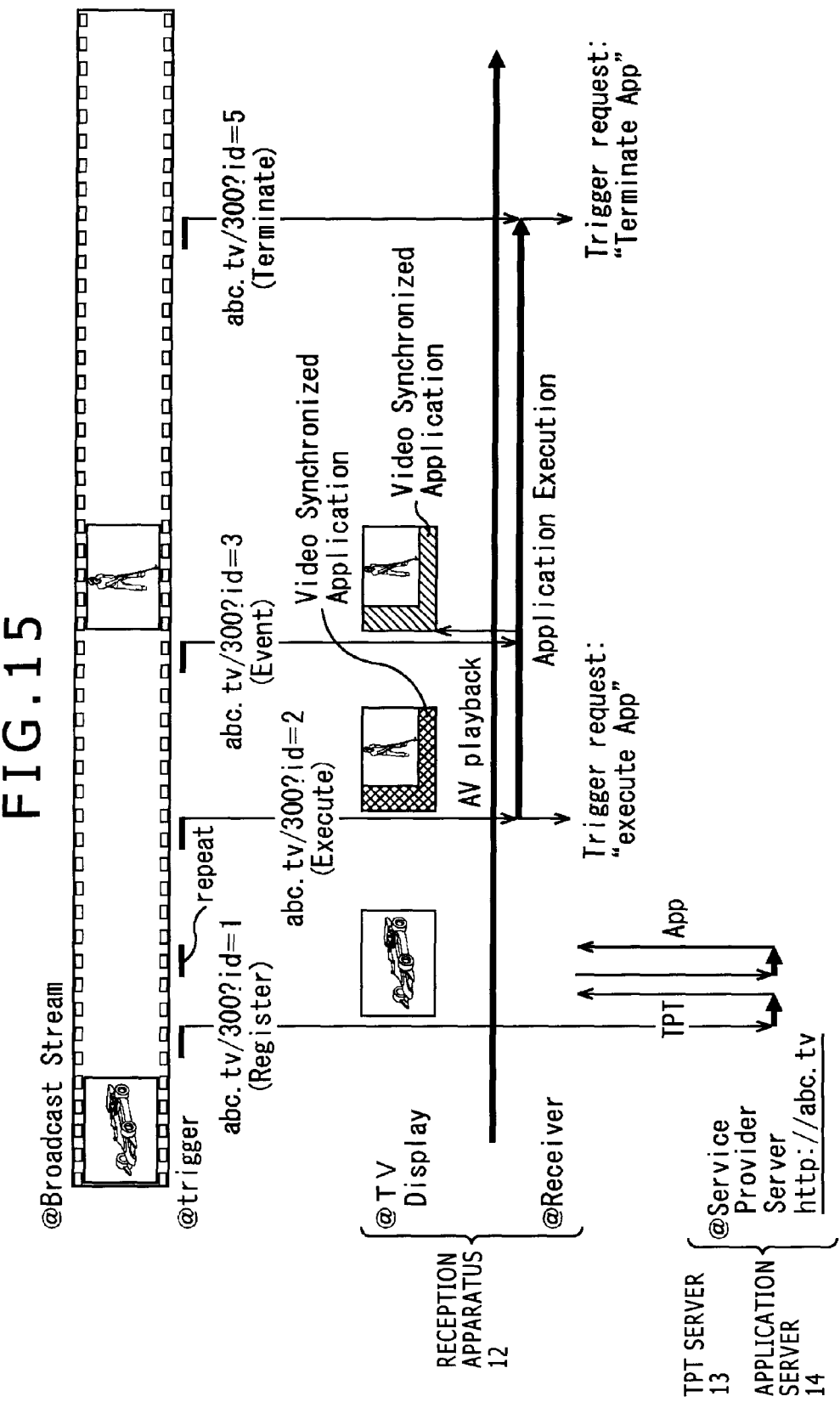
FIG. 15 is a schematic view showing a typical operation scenario.

When the reception apparatus 12 performs the above-described trigger information handling process, it is possible to operate the data broadcast application as illustrated in FIG. 15 for example.

FIG. 15 shows a typical operation scenario.

In FIG. 15, while the digital TV program corresponding to the digital TV broadcast signal from the broadcast unit 11 is displayed on the display device, the reception apparatus 12 continuously extracts trigger information. And if the domain_name or program_id included in the trigger information has changed, the reception apparatus 12 sends a query for a TPT to the TPT server 13 by accessing the URL acquired by adding the character string "http://" to the trigger information. In this manner, the reception apparatus 12 can acquire the TPT from the TPT server 13 and retain the acquired TPT.

Thereafter, the reception apparatus 12 continuously extracts the trigger information and, with the trigger information extracted, determines the command corresponding to the trigger information based on the TPT. For example, if the command determined by the trigger information "abc.tv/300?id=1" is the register command, the reception apparatus 12 accesses the application server 14 corresponding to the application URL, acquires the data broadcast application therefrom, and registers the acquired data broadcast application. Furthermore, if the already handled trigger information ("abc.tv/300?id=1" is received, the reception apparatus 12 ignores that trigger information (indicated as "repeat" in FIG. 15).

The reception apparatus 12 continuously extracts the trigger information thereafter. If the command determined by the trigger information "abc.tv/300?id=2" is the execute command, the acquired data broadcast application is activated. This causes the display device to display program-related information (indicated as "Video Synchronized Application" in FIG. 15) in a manner superposed on the digital TV program.

Further, the reception apparatus 12 continuously extracts the trigger information. If the command determined by the trigger information "abc.tv/300?id=3" is the event command, an event is fired into the currently executing data broadcast application. This causes the display device to change the substance of the program-related information displayed in a manner superposed on the digital TV program.

And if the command determined by the trigger information "abc.tv/300?id=5" is the terminate command, the reception apparatus 12 terminates the currently executing data broadcast application. This causes the display device to turn off the program-related information superposed on the digital TV program, leaving only the program displayed.

As explained above, the reception apparatus 12 can determine the command corresponding to the trigger information from the broadcast unit 11 by retaining the TPT corresponding to the server determination information (domain_name)

or content identification information (program_id). This makes it possible to implement the operation scenario shown in FIG. 15.

Second Embodiment

[Typical Configuration of the Communication System]

The foregoing description explained examples in which the digital TV broadcast signal of audio video content such as digital TV programs is transmitted from the broadcast unit 11. Alternatively, the audio video content may be distributed by VOD (Video On Demand) via the Internet 20.

Figure 16:
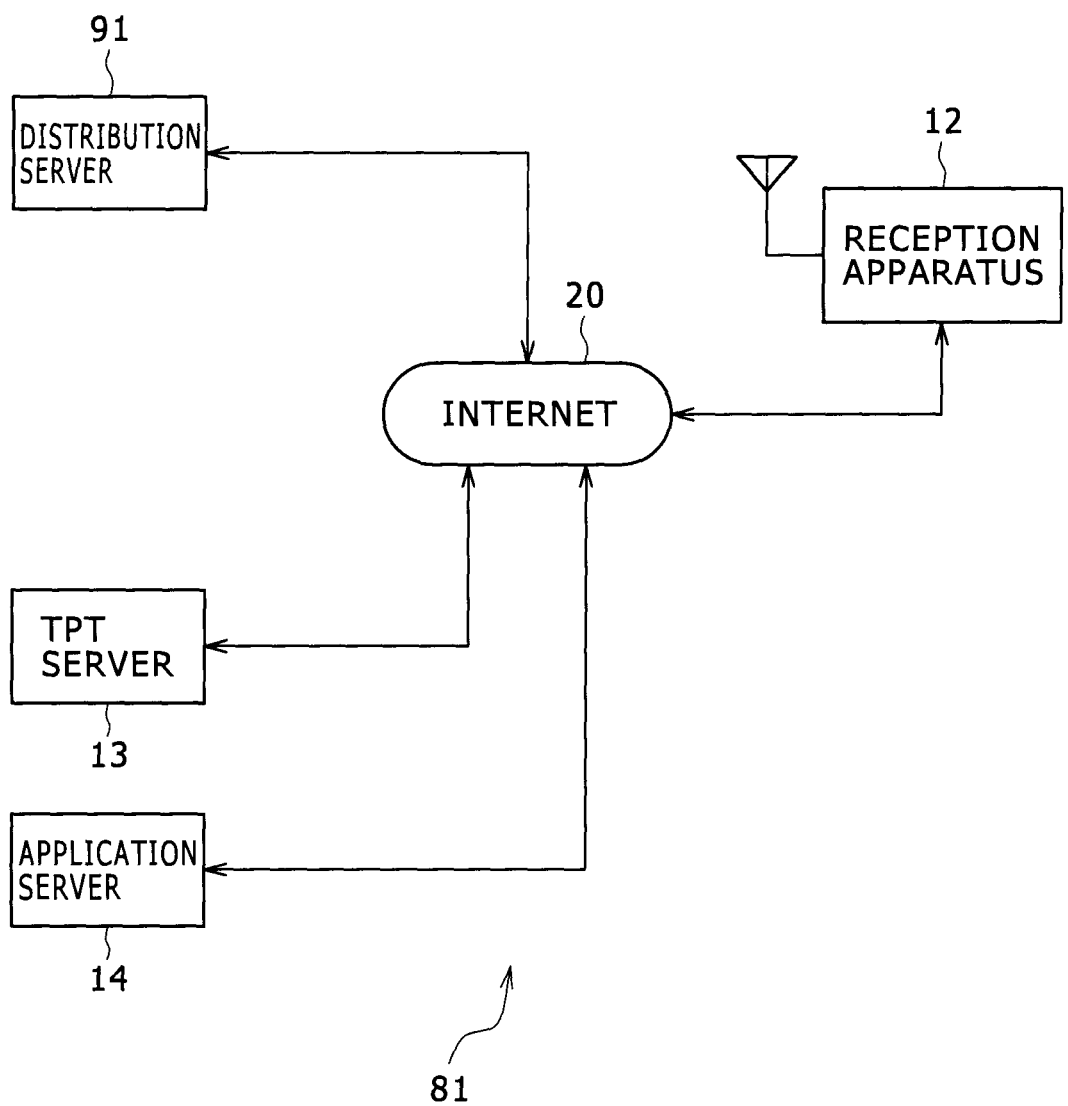
FIG. 16 is a schematic view showing a typical configuration of a communication system.

FIG. 16 shows a communication system 81 embodying the present disclosure.

Of the components shown in FIG. 16, those whose corresponding counterparts are found in FIG. 1 are designated by like reference numerals, and their explanations may be omitted where appropriate.

That is, compared with FIG. 1, FIG. 16 shows a distribution server 91 replacing the broadcast unit 11 and connected to the Internet 20. In response to requests from the reception apparatus 12, the distribution server 91 distributes audio video content such as VOD content to the reception apparatus 12 via the Internet 20. Also, the distribution server 91 transmits trigger information together with the VOD content to the reception apparatus 12.

The reception apparatus 12 extracts the trigger information transmitted along with the VOD content from the distribution server 91, and acquires from the TPT server 13 the TPT corresponding to the item "domain_name" or "program_id" included in the extracted trigger information. And based on the TPT from the TPT server 13, the reception apparatus 12 determines the command corresponding to the trigger information from the distribution server 91. In response to the command thus determined, the reception apparatus 12 controls the operation of the data broadcast application executed in interlocked relation to the VOD content.

In this manner, the reception apparatus 12 receives audio video content not only through the broadcasting network but also via the communication network. Whether the audio video content is received from the broadcasting network or from the communication network, the reception apparatus 12 can acquire the TPT corresponding to the server determination information (domain_name) or content identification information (program_id) included in the trigger information transmitted along with the audio video content of interest. As a result, the reception apparatus 12 can determine the command corresponding to the trigger information based on the acquired TPT.

The foregoing description showed examples in which a plurality of servers such as the TPT server 13 and application servers 14 are provided to implement different functions being offered. Alternatively, part or all of these functions may be offered collectively by a single server or by a plurality of servers.

As explained above, according to this technology, it is possible to provide data broadcast applications that are executed in interlocked relation to audio video content such as digital TV programs and VOD content.

Furthermore, the trigger information can also be given to the reception apparatus 12 through a dedicated terminal such as the set-top box. Thus the broadcasting system 1 can offer data broadcast applications without recourse to renovating its broadcast transmission channel equipment such as the CATV network as well as its dedicated terminals. Also, there is no need to perform such work as obtaining permission from the broadcast operator relaying programs.

[Explanation of the Computer to which this Technology is Applied]

The series of processes described above may be executed either by hardware or by software. Where the software-based series of processing is to be carried out, the programs constituting the software may be installed into any suitable computer for execution. The computers may include those with the software incorporated in their dedicated hardware beforehand, and those such as general-purpose personal computers or the like capable of executing diverse functions based on diverse programs installed therein.

FIG. 17 is a block diagram showing a typical hardware structure of a computer for executing the above-described series of processing based on programs.

In the computer, a CPU (Central Processing Unit) 101, a ROM (Read Only Memory) 102, and a RAM (Random Access Memory) 103 are interconnected via a bus 104.

An input/output interface 105 is further connected to the bus 104. The input/output interface 105 is connected with an input portion 106, an output portion 107, a recording portion 108, a communication portion 109, and a drive 110.

The input portion 106 is typically made up of a keyboard, a mouse, and a microphone. The output portion 107 is usually composed of a display device and speakers. The recording portion 108 is generally constituted by a hard disk and a nonvolatile memory. The communication portion 109 is formed by a network interface or the like. The drive 110 drives removable media 111 such as magnetic disks, optical disks, magneto-optical disks, or semiconductor memories.

In the computer structured as outlined above, the above-described series of processing is carried out, for example, by the CPU 101 that loads programs stored in the recording portion 108 into the RAM 103 for execution through the input/output interface 105 and bus 104.

The programs to be executed by the computer (i.e., by CPU 101) may be offered recorded on the removable media 111 typically prepared as packaged media. Also, the programs may be offered via wired or wireless transmission media such as local area networks, the Internet, and digital satellite broadcasts.

In the computer, the programs may be installed into the recording portion 108 via the input/output interface 105 from the removable media 111 loaded in the drive 110. Also, the programs may be received by the communication portion 109 via wired or wireless transmission media and installed into the recording portion 108. Alternatively, the programs may be preinstalled in the ROM 102 or in the recording portion 108.

Incidentally, the programs may be processed chronologically in the sequence explained in this specification, or may be processed in parallel or in otherwise appropriately timed fashion such as when they are invoked.

In this specification, the processing steps that describe the programs for causing the computer to perform various processes need not necessarily be processed chronologically in the sequence depicted as flowcharts; the steps may also include those processed parallelly or individually (e.g., in paralleled or object-oriented fashion).

Also, the programs may be processed by a single computer or by a plurality of computers on a distributed basis. The programs may also be transferred to a remote computer or computers for execution.

Furthermore, in this specification, the term "system" means an aggregate of a plurality of component elements (apparatuses, modules (parts), etc.). All component elements may or may not be housed in a single enclosure. Therefore, a plurality of apparatuses each housed in a separate enclosure and connected via a network are considered a network, and a single apparatus formed by a plurality of modules housed in a single enclosure are also regarded as a system.

Also, it should be understood that this technology when embodied is not limited to the above-described embodiments and that various modifications, variations and alternatives may be made of this technology so far as they are within the spirit and scope thereof.

For example, this technology may be structured for cloud computing whereby a single function is shared and processed in collaboration among a plurality of apparatuses via a network.

Also, each of the steps explained in reference to the above-described flowcharts may be executed not only by a single apparatus but also by a plurality of apparatuses in a shared manner.

Furthermore, if one step includes a plurality of processes, these processes included in the step may be performed not only by a single apparatus but also by a plurality of apparatuses in a shared manner.

Furthermore, this technology may be structured as follows:

(1)

A reception apparatus including:

a reception portion configured to receive audio video content;

a trigger extraction portion configured to extract trigger information for operating an application program transmitted along with the audio video content and executed in interlocked relation to the audio video content;

a table acquisition portion configured to acquire a correspondence table for associating the trigger information with commands for controlling the operation of the application program;

a command determination portion configured such that, based on the acquired correspondence table, the command determination portion determines the commands associated with the extracted trigger information; and a control portion configured to control the operation of the application program in response to the determined commands.

(2)

The reception apparatus described in (1) above, further including:

an output portion configured to output the audio video content, or the audio video content as well as the application program;

wherein the table acquisition portion acquires the correspondence table if the audio video content being output is changed in substance.

(3)

The reception apparatus described in (1) or (2) above, wherein the trigger information includes determination information for determining an information processing apparatus providing the correspondence table and first identification information for identifying the audio video content; and if the determination information or the first identification information included in the extracted trigger information is changed, the table acquisition portion acquires the correspondence table from the information processing apparatus in accordance with the determination information and the first identification information.

(4)

The reception apparatus described in (3) above, wherein the correspondence table further associates the trigger information and the commands with second identification information for identifying the application program; and the command determination portion determines the commands associated with the trigger information regarding each of the application programs identified by the second identification information associated with the extracted trigger information.

(5)

The reception apparatus described in any one of (1) through (4) above, wherein the control portion controls the operation of one or a plurality of the application programs in response to the determined commands.

(6)

The reception apparatus in any one of (1) through (5) above, wherein the trigger information includes information indicative of the probability of the trigger information itself becoming effective; and if the trigger information becomes effective, the control portion controls the operation of the application program in response to the commands.

(7)

The reception apparatus described in any one of (1) through (6) above, wherein the commands designate acquisition or registration, acquisition or activation, firing of an event, suspension, or termination of the application program; and in response to each of the commands, the control portion controls acquisition or registration, acquisition or activation of the application program, firing of an event into the currently executing application program, suspension, or termination of the currently executing application program.

(8)

A reception method for use with a reception apparatus, the reception method executing the reception apparatus to include:

receiving audio video content;

extracting trigger information for operating an application program transmitted along with the audio video content and executed in interlocked relation to the audio video content;

acquiring a correspondence table for associating the trigger information with commands for controlling the operation of the application program;

based on the acquired correspondence table, determining the commands associated with the extracted trigger information; and controlling the operation of the application program in response to the determined commands.

(9)

A program for causing a computer to function as:

a reception portion configured to receive audio video content;

a trigger extraction portion configured to extract trigger information for operating an application program transmitted along with the audio video content and executed in interlocked relation to the audio video content;

a table acquisition portion configured to acquire a correspondence table for associating the trigger information with commands for controlling the operation of the application program;

a command determination portion configured such that, based on the acquired correspondence table, the command determination portion determines the commands associated with the extracted trigger information; and a control portion configured to control the operation of the application program in response to the determined commands.

(10)
An information processing system including:
a reception apparatus;
a first information processing apparatus; and
a second information processing apparatus,
the reception apparatus including
a reception portion configured to receive audio video content,
a trigger extraction portion configured to extract trigger information for operating an application program transmitted along with the audio video content and executed in interlocked relation to the audio video content,
a table acquisition portion configured to acquire from the first information processing apparatus a correspondence table for associating the trigger information with commands for controlling the operation of the application program,
a command determination portion configured to determine, based on the acquired correspondence table, the commands associated with the extracted trigger information, and
a control portion configured to control the operation of the application program acquired from the second information processing apparatus in response to the determined commands,
the first information processing apparatus including
a first provision portion configured to provide the correspondence table in response to a query from the reception apparatus, and
the second information processing apparatus including
a second provision portion configured to provide the application program in response to a query from the reception apparatus.

What is claimed is:

1. A reception apparatus comprising:
a memory; and
circuitry configured to
receive audio video content,
extract trigger information for operating an application program transmitted along with said audio video content and executed in interlocked relation to said audio video content,
acquire a correspondence table for associating said trigger information with commands for controlling the operation of said application program,
store said application program and said correspondence table in said memory,
based on the stored correspondence table, determine said commands associated with the extracted trigger information, and
control the operation of said application program in response to the determined commands.

2. The reception apparatus according to claim 1, wherein the circuitry is configured to
output said audio video content, or said audio video content as well as said application program, and
acquire said correspondence table when said audio video content being output is changed in substance.

3. The reception apparatus according to claim 2, wherein said trigger information includes determination information for determining an information processing apparatus providing said correspondence table or first identification information for identifying said audio video content; and
when said determination information or said first identification information included in the extracted trigger information is changed, said circuitry acquires said correspondence table from said information processing apparatus in accordance with said determination information and said first identification information.

4. The reception apparatus according to claim 3, wherein said correspondence table further associates said trigger information and said commands with second identification information for identifying said application program; and
said circuitry is configured to determine said commands associated with said trigger information regarding each of a plurality of application programs identified by said second identification information associated with the extracted trigger information.

5. The reception apparatus according to claim 4, wherein said circuitry is configured to control the operation of one or a plurality of said application programs in response to the determined commands.

6. The reception apparatus according to claim 1, wherein said trigger information includes information indicative of the probability of said trigger information itself becoming effective; and
when said trigger information becomes effective, said circuitry controls the operation of said application program in response to said commands.

7. The reception apparatus according to claim 1, wherein said commands designate acquisition or registration, acquisition or activation, firing of an event, suspension, or termination of said application program; and
in response to each of said commands, said circuitry controls acquisition or registration, acquisition or activation of said application program, firing of an event into the currently executing application program, suspension, or termination of said currently executing application program.

8. A reception method for use with a reception apparatus, said reception method executing said reception apparatus to comprise:
receiving audio video content;
extracting trigger information for operating an application program transmitted along with said audio video content and executed in interlocked relation to said audio video content;
acquiring a correspondence table for associating said trigger information with commands for controlling the operation of said application program;
storing said application program and said correspondence table in a memory of said reception apparatus;
based on the stored correspondence table, determining by said reception apparatus said commands associated with the extracted trigger information; and
controlling by said reception apparatus the operation of said application program in response to the determined commands.

9. A non-transitory computer-readable storage medium storing a program which when executed by a computer causes the computer to:
receive audio video content;
extract trigger information for operating an application program transmitted along with said audio video content and executed in interlocked relation to said audio video content;
acquire a correspondence table for associating said trigger information with commands for controlling the operation of said application program;
store said application program and said correspondence table in a memory of said computer;

based on the stored correspondence table, determine by said computer said commands associated with the extracted trigger information; and control the operation of said application program in response to the determined commands.

10. An information processing system comprising:

a reception apparatus;

a first information processing apparatus; and a second information processing apparatus, said reception apparatus including a memory, and circuitry configured to receive audio video content, extract trigger information for operating an application program transmitted along with said audio video content and executed in interlocked relation to said audio video content, acquire from said first information processing apparatus a correspondence table for associating said trigger information with commands for controlling the operation of said application program, store said application program and said correspondence table in said memory, determine, based on the stored correspondence table, said commands associated with the extracted trigger information, and control the operation of said application program, which is stored in said memory and acquired from said second information processing apparatus in response to the determined commands, said first information processing apparatus including circuitry configured to provide said correspondence table in response to a query from said reception apparatus, and said second information processing apparatus including circuitry configured to provide said application program in response to a query from said reception apparatus.

11. The reception apparatus according to claim 1, wherein the correspondence table associates each of a plurality of different trigger information for operating the application program with a different one of the commands.

12. The reception apparatus according to claim 1, wherein the application program and the correspondence table are stored separately in the memory.

* * * * *